(12) United States Patent
Chintala et al.

(10) Patent No.: US 12,277,101 B2
(45) Date of Patent: Apr. 15, 2025

(54) DATAFRAME WORKLOADS USING READ-ONLY DATA SNAPSHOTS

(71) Applicant: Snowflake Inc., Bozeman, MT (US)

(72) Inventors: Srilakshmi Chintala, Seattle, WA (US); Jianzhun Du, Kirkland, WA (US); Naresh Kumar, Santa Clara, CA (US); Srinath Shankar, Belmont, CA (US); Leonhard Franz Spiegelberg, San Francisco, CA (US); Eric Shawn Vandenberg, Saratoga, CA (US); Andong Zhan, San Mateo, CA (US); Yun Zou, Sunnyvale, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/393,279

(22) Filed: Dec. 21, 2023

(65) Prior Publication Data
US 2025/0094403 A1   Mar. 20, 2025

Related U.S. Application Data

(60) Provisional application No. 63/583,525, filed on Sep. 18, 2023.

(51) Int. Cl.
*G06F 16/22* (2019.01)
*G06F 16/11* (2019.01)
(Continued)

(52) U.S. Cl.
CPC ........ *G06F 16/2272* (2019.01); *G06F 16/128* (2019.01); *G06F 16/244* (2019.01); *G06F 16/2453* (2019.01)

(58) Field of Classification Search
CPC .. G06F 16/2272; G06F 16/128; G06F 16/244; G06F 16/2453
See application file for complete search history.

(56) References Cited

U.S. PATENT DOCUMENTS

| 2020/0097325 | A1 | 3/2020 | Vadapandeshwara et al. |
| 2020/0327252 | A1 | 10/2020 | Mcfall et al. |
| 2024/0311202 | A1* | 9/2024 | Battat ................. G06F 9/45558 |

OTHER PUBLICATIONS

"U.S. Appl. No. 18/393,324, Notice of Allowance mailed Sep. 27, 2024", 10 pages.

(Continued)

*Primary Examiner* — Jared M Bibbee
(74) *Attorney, Agent, or Firm* — Schwegman Lundberg & Woessner, P.A.

(57) ABSTRACT

A method provides deterministic row ordering for query result sets in a database system. A framework receives a query referencing a database table and generating a row index column in response. The framework generates the row index column that involves determining an order associated with source files underlying the referenced table and assigns each table row a unique index value based on the file order and row position within the files. The framework executes the received query to produce a result set ordered by the generated row index column. The framework determines row order based on analyzing underlying data file metadata and facilitates returning the result set with consistent, reliable ordering, enabling stable positional-based access semantics when querying distributed database tables.

30 Claims, 12 Drawing Sheets

(51) Int. Cl.
  *G06F 16/242* (2019.01)
  *G06F 16/2453* (2019.01)

(56) References Cited

OTHER PUBLICATIONS

"Best Practices—Pyspark Master Documentation", [Online]. Retrieved from the Internet: <https://spark.apache.org/docs/latest/api/python/user_guide/pandas_on_spark/best_practices.html#best-practices>, (Accessed on Jul. 9, 2024), 5 pages.
"Categorical data—Pandas 2.2", [Online]. Retrieved from the Internet: <https://pandas.pydata.org/docs/user_guide/categorical.html>, (Accessed on Jul. 9, 2024), 41 pages.
"Duplicate Labels—pandas 2.2", [Online]. Retrieved from the Internet: <https://pandas.pydata.org/docs/user_guide/duplicates.html>, (Accessed on Jul. 9, 2024), 10 pages.
"Iris—UCI Machine Learning Repository", [Online]. Retrieved from the Internet: <https://archive.ics.uci.edu/dataset/53/iris>, (Accessed on Jul. 9, 2024), 5 pages.
"MultiIndex/advanced indexing—pandas 2.2.pdf", [Online]. Retrieved from the Internet: <https://pandas.pydata.org/docs/user_guide/advanced.html>, (Accessed on Jul. 9, 2024), 47 pages.
"New Features in 19c Release Updates", [Online]. Retrieved from the Internet: <https://docs.oracle.com/en/database/oracle/oracle-database/19/newft/new-features-19c-release-updates.html#GUID-AC0DAFEE-2DFF-4EA8-A9B9-DB0E0E76211B>, (Accessed on Jul. 9, 2024), 13 pages.
"Options and settings—PySpark master documentation", [Online]. Retrieved from the Internet: <https://spark.apache.org/docs/latest/api/python/user_guide/pandas_on_spark/options.html#default-index-type>, (Accessed on Jul. 9, 2024), 6 pages.
"Pandas.ArrowDtype—pandas 2.2", [Online]. Retrieved from the Internet: <https://pandas.pydata.org/docs/reference/api/pandas.ArrowDtype.html>, (Accessed on Jul. 9, 2024), 2 pages.
"Pandas.CategoricalDtype—pandas 2.2", [Online]. Retrieved from the Internet: <https://pandas.pydata.org/docs/reference/api/pandas.CategoricalDtype.html>, (Accessed on Jul. 9, 2024), 2 pages.
"Pandas.DataFrame.pivot—pandas 2.2", [Online]. Retrieved from the Internet: <https://pandas.pydata.org/docs/reference/api/pandas.DataFrame.pivot.html>, (Accessed on Jul. 9, 2024), 4 pages.
"Pandas.DataFrame.pivot_table—pandas 2.2", [Online]. Retrieved from the Internet: <https://pandas.pydata.org/docs/reference/api/pandas.DataFrame.pivot_table.html>, (Accessed on Jul. 9, 2024), 4 pages.
"Pandas.DataFrame.transpose—pandas 2.2", [Online]. Retrieved from the Internet: <https://pandas.pydata.org/docs/reference/api/pandas.DataFrame.transpose.html>, (Accessed on Jul. 9, 2024), 3 pages.
"Pandas.SparseDtype—pandas 2.2", [Online]. Retrieved from the Internet: <https://pandas.pydata.org/docs/reference/api/pandas.SparseDtype.html>, (Accessed on Jul. 9, 2024), 2 pages.
"Pandas.Timestamp", [Online]. Retrieved from the Internet: <https://pandas.pydata.org/docs/reference/api/pandas.Timestamp.html>, (Accessed on Jul. 9, 2024), 7 pages.
"Snapshot Concepts & Architecture", [Online]. Retrieved from the Internet: <https://docs.oracle.com/cd/A87860_01/doc/server.817/a76959/mview.htm>, (Accessed on Jul. 9, 2024), 28 pages.
Mckinney, Wes, "Apache Arrow and the "10 Things I Hate About pandas"", [Online]. Retrieved from the Internet: <Iris—UCI Machine Learning Repository>, (Accessed on Jul. 9, 2024), 8 pages.
Modin, "System Architecture", [Online]. Retrieved from the Internet: <https://modin.readthedocs.io/en/latest/development/architecture.html>, (Accessed online Jul. 10, 2024), 11 pages.

* cited by examiner

DATAFRAME WORKLOADS USING READ-ONLY DATA SNAPSHOTS

CROSS-REFERENCE TO RELATED APPLICATIONS

The present application claims the benefit of and right of priority to U.S. Provisional Patent Application Ser. No. 63/583,525, filed on Sep. 18, 2023, entitled, "ROW-ORDER DEPENDENT WORKLOADS AND READ-ONLY DATA SNAPSHOTS," all of the contents of which are hereby incorporated by reference herein in its entirety.

TECHNICAL FIELD

The present disclosure generally relates to special-purpose machines that manage data platforms and databases and, more specifically, to incorporating a developer framework and programming environment for dataframe workloads using read-only data snapshots.

BACKGROUND

Network-based database systems can be provided through a cloud data platform, which allows organizations, customers, and users to store, manage, and retrieve data from the cloud. Cloud data platforms are widely used for data storage and data access in computing and communication contexts. With respect to architecture, a cloud data platform could be an on-premises data platform, a network-based data platform (e.g., a cloud-based data platform), another type of architecture, or some combination thereof. With respect to type of data processing, a cloud data platform could implement online analytical processing (OLAP), online transactional processing (OLTP), a combination of the two, another type of data processing, or some combination thereof. Moreover, a cloud data platform could be or include a relational database management system (RDBMS) or one or more other types of database management systems.

In an implementation of a cloud data platform, a given database (e.g., a database maintained for a customer account) can reside as an object (e.g., within a customer account) that can also include one or more other objects (e.g., users, roles, privileges, and/or the like). Furthermore, a given object, such as a database, can itself contain one or more objects such as schemas, tables, materialized views, and/or the like. A given table can be organized as a collection of records (e.g., rows) that each include a plurality of attributes (e.g., columns). In some implementations, database data can be physically stored across multiple storage units, which may be referred to as files, blocks, partitions, micro-partitions, and/or by one or more other names. In many cases, a database on a cloud data platform serves as a backend for one or more applications that are executing on one or more application servers.

Data engineers are focused primarily on building and maintaining data pipelines that transport data through different steps and put it into a usable state. The data engineering process encompasses the overall effort required to create data pipelines that automate the transfer of data from place to place and transform that data into a specific format for a certain type of analysis. In that sense, data engineering is an ongoing practice that involves collecting, preparing, transforming, and delivering data. A data pipeline helps automate these tasks so they can be reliably repeated.

BRIEF DESCRIPTION OF THE SEVERAL VIEWS OF THE DRAWINGS

The present disclosure will be apparent from the following more particular description of examples of embodiments of the technology, as illustrated in the accompanying drawings. The drawings are not necessarily to scale, emphasis instead being placed upon illustrating embodiments of the present disclosure. In the drawings, like numerals may describe similar components in different views. Like numerals having different letter suffixes may represent different instances of similar components. Various ones of the appended drawings merely illustrate example embodiments of the present disclosure and should not be considered as limiting its scope.

DETAILED DESCRIPTION

Figure 1:
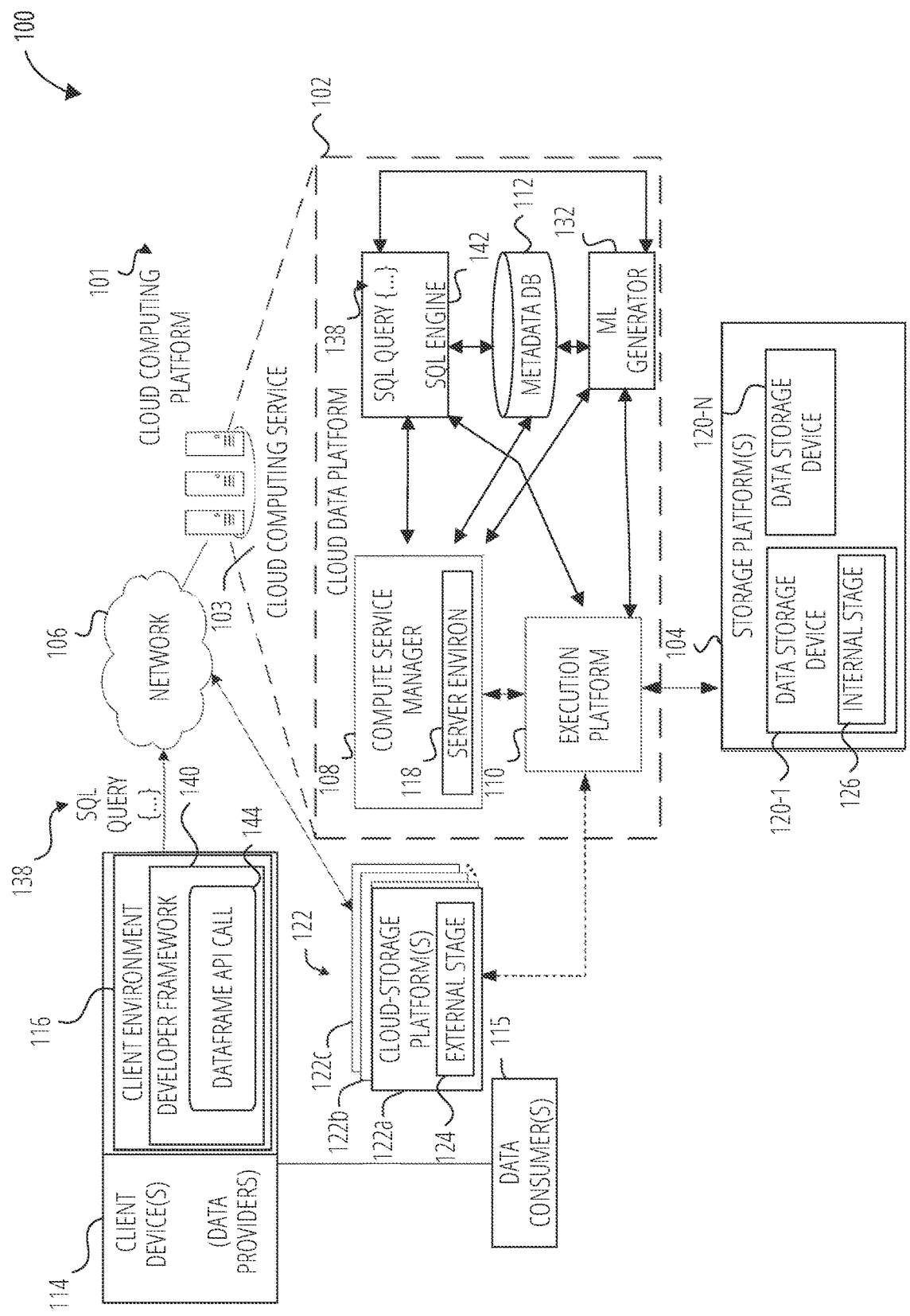
FIG. 1 illustrates an example computing environment in which a cloud data platform, in communication with a cloud storage platform, can implement DataFrame functionality, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail. For the purposes of this description, the phrase "cloud data platform" may be referred to as and used interchangeably with the phrases "a network-based database system," "a database system," or merely "a platform."

Disclosed herein are various examples of systems and methods for providing a developer framework and programming environment that integrates application development capabilities directly into a cloud data platform, enabling developers to author scripts and applications utilizing common programming languages that can interface with the cloud data warehouse tables, execute queries, invoke functions, and similar operations. The cloud data platform including the developer framework and programming environment extends SQL-based processing engines to preserve row-order by introducing a non-SQL compliant primitive to enable row-order dependent DataFrame workloads on structured query language (SQL) processing engines. Examples further extend the cloud data platform SQL engine to allow creation of a read-only data snapshot, which is computationally and resource inexpensive to create, while being logically immutable and preserving underlying data storage layout throughout the lifetime of the snapshot object. The immutable snapshot object can be used to further preserve row-order for use on deterministic workloads on SQL processing engines.

The developer framework and programming environment facilitates the development of data applications and execution of custom logic directly within the cloud data platform, obviating the need for external platforms. For example, the developer framework and programming environment includes a secure deployment and processing of non-SQL code, consisting of two layers: user-familiar client-side libraries and runtimes for secure deployment and processing of the non-SQL code on the cloud data platform. This confers several advantages including tight integration between application code and data, avoiding performance-hindering data movement; a unified security model without reproduction of access controls; leveraging the cloud data platform's distributed, parallelized query execution engine to confer efficient scaling; accessing external services, software development kits and data from within the cloud data platform environment, eliminating the need for a separate application server layer; and streamlined development and deployment completely within the cloud data platform utilizing familiar programming languages. In contrast, alternative solutions necessitate extracting data from the cloud data platform into an external application layer, incurring data movement costs, requiring reproduction of security models, limiting scale-out capabilities, and complicating development and deployment. By unifying application code, data and compute within the cloud data platform, the developer framework and programming environment delivers tighter integration for modern data applications compared to alternatives reliant on external application layers. The developer framework and programming environment brings deeply integrated, DataFrame-style programming and open-source software (OSS) compatible APIs to the languages that users (e.g., data practitioners) like to use. It provides familiar APIs for various data centric tasks, including data preparation, cleansing, preprocessing, model training, deployments tasks, machine learning, and the like.

There are two major challenges to supporting DataFrame workloads within a cloud data platform, including data consistency and deterministic row position assignment. First, data consistency is necessary such that the data returned should be as if a snapshot of the data is returned to the client upon request. Dataframe semantics imply that a constructed DataFrame behaves as if data is persisted in memory. For example, when creating a DataFrame from an operation, repeated display of the same DataFrame should show the same result even if the source data (e.g., a SQL table, underlying file, etc.) has changed, requiring a reload to reflect an underlying change in data. Second, deterministic row position assignment is needed, such that an implicit row number column in the DataFrame is defined on creation and maintained throughout the transformations.

Existing technologies such as PANDAS are limited to a single machine causing a scalability issue that forces users to either scale down their data or sample their data, provision a larger machine or virtual machine, or port existing code to target other big-data frameworks. Existing technologies attempted to create solutions using temporary tables, including using as an initial step of the creation of a temporary table with an explicitly materialized row number computation to provide a reusable and trackable row position. This solution has multiple disadvantages including that the result stored in the temporary table is not replicable across queries, because row orders and positions obtained from subsequent query runs may differ. For example, when a session ends, the row ordering information is lost and cannot be restored. Using temporary tables is additionally disadvantageous as the row position needs to be materialized as a column, and the creation of the temporary table is slow, such that it incurs additional resource cost to users of the lifespan of a session. For example, creating temporary tables is an expensive operation as it materializes all data and only drops the materialized data after the session ends, which introduces extra cost to the customer. Moreover, when the data becomes large, materializing all data becomes a slow operation.

Other existing technologies attempted a solution using windowing over a generator function (e.g., PANDAS API or Spark®) to attach a default index when converting from a local, client-side PANDAS DataFrame to a distributed DataFrame. However, for data files and/or source files stored in a distributed file system, a non-deterministic row ordering is computed via a monotonically increasing identifier. An additional problem is that there still may be duplicates, as it is monotonically increasing but not strictly monotonically increasing. For example, the difference is monotonically increasing is 0, 0, 1, 2, 3, 3, 3, 3, 4, 7, 7, 8, 9; whereas strictly monotonically increasing is 0, 1, 10, 20, 45, 68; whereas strictly monotonically increasing gap-free sequence of integers could be 0, 1, 2, 3, 4, 5, 6, for example and not limitation. Example embodiments of the present disclosure provide generating a strictly monotonically increasing gap-free sequence of integers efficiently.

The row position obtained by such a columnar expression is not repeatably computable across queries and within a session, and also does not produce deterministic results. As such, this existing technology only enables positional indexing by chance. The row number values generated by this expression cannot be reliably reproduced if the same query is run multiple times. The results may differ across separate runs of the query. Even within the same user session, repeating this query can produce different row numbers. They are not deterministic. Because the results are not repeatable or reliable, this means any DataFrame APIs that rely on positional row access (e.g., iloc or head/tail) cannot be properly supported using this approach. Those operations require a deterministic row index that consistently addresses the same rows. In other words, the non-deterministic nature of the row numbers produced by window functions like a monotonic increasing sequence generator, monotonic generator, or the like, for example, ROW_NUMBER( ) OVER (ORDER BY SEQ8( )) makes them insufficient for enabling key DataFrame semantics around stable, positional row access and order dependency. Example embodiments of the present disclosure introduce a better solution through a dedicated RUNNING_INDEX( ) primitive.

According to example embodiments, a developer can use the developer framework and programming environment to compute a deterministic row position by deterministically sorting on the filenames of the underlying data files to determine an order, and then compute, for each file, a running index number by feeding offsets to each worker reading in a file. For example, and not limitation, the running_index primitive can be implemented in the following way by deterministically sorting on filenames of underlying data files to determine order, and then compute for each file a sequence by feeding offsets to each worker reading in a file. Such a computation can form a metadata column or a pseudo-column that includes information about the deterministic row number to back a SQL primitive. For example, an efficient way to represent the result of the running index primitive is to form a metadata column (e.g., a pseudo-column). By implementing this simple primitive, DataFrame workloads requiring row order are enabled in an efficient and inexpensive way, while the actual materialization of the column can be avoided (resulting in minimal overhead and resource cost to both the user and the cloud data platform). Example embodiments assigning each row of a database table a unique row position value (e.g., row index value) based on file offsets provide enhanced performance of certain operations like appending rows compared to strictly logical ordering schemes that require sorting or temporary materialization. Leveraging file offsets to assign deterministic row indexes bolsters consistency and accessibility while reducing the underlying computational work required for certain order-dependent operations. The deeply integrated programming experience of the developer framework and programming environment improves developer productivity when building analytics and data processing workflows leveraging the scale and performance of the cloud data platform. This ultimately provides a better experience for users.

SQL queries rely on data being read from files ultimately (e.g., this is true for table selection statements and also for any view). At the time of issuing a query, the underlying files have fixed names and contents on a file system due to its atomicity. Without the use of methodologies described herein, an expensive temporary table must be relied upon to guarantee DataFrame semantics, or correct semantics for DataFrames will not be able to be provided at all in regard to positional indexing.

Example embodiments obviate the need for extracting data outside the cloud data warehouse for processing and furnishing access to external services, data sources, and additional functionality from within the executed code, including software development kits (SDKs) for supported languages, a web-based integrated development environment (IDE) for authoring, debugging, and executing scripts, and the capability to develop and deploy scalable, secure data applications entirely within the cloud data warehouse. By complementing SQL with the option of programmatic logic in prevalent languages, the developer framework and programming environment enables new use cases and workloads that can now be directly handled inside the cloud data warehouse, simplifying the development and deployment of modern data applications.

Example embodiments of the methodologies described herein facilitate solving the technical problems of a SQL query returning rows in an arbitrary order, such that running the same query will not return the same results in the same order. By providing an execution engine using SQL within a cloud data platform including a developer framework and programming environment with DataFrame capabilities enables each operation to be order preserving, where running the same query will return results in the same order. As such, one or more of the methodologies described herein can obviate a need for certain efforts or computing resources that otherwise would be involved in complicating the exchange of data. As a result, resources used by one or more machines, databases, or devices (e.g., within the environment) can be reduced. Examples of such computing resources include processor cycles, network traffic, memory usage, data storage capacity, power consumption, network bandwidth, and cooling capacity.

Example embodiments of the present disclosure overcome deficiencies in prior solutions for a plethora of reasons. For example, improvements include providing support for interacting with data within the cloud data platform using libraries and patterns built for different languages without compromising performance or functionality, providing support for authoring developer framework and programming environment code using local tools, providing for all computations to be performed within the cloud data platform (e.g., no requirement for a separate cluster), providing support for pushdown for all operations including cloud data platform UDFs (e.g., the developer framework and programming environment pushes down all data transformation and heavy lifting to the cloud data platform, enabling efficient work with data of any size). Additional improvements include reduced data transfer requirements (e.g., reducing the amount of data transferred between the client and the cloud data platform database) and improved performance using DataFrame objects. Further technological improvements include providing a developer with the ability to create user-defined functions inline in the developer framework and programming environment application, such that the developer framework and programming environment can push the code to the server (e.g., where the data is) where the code can operate on the data at scale (e.g., useful for looping or batch functionality).

Additional example embodiments can be performed in a sandbox environment. In computer security, a sandbox (e.g., sandbox environment) is a security mechanism for separating running programs, usually to prevent system failures or prevent exploitation of software vulnerabilities. A sandbox can be used to execute untested or untrusted packages, programs, functions, or code, possibly from unverified or untrusted third parties, suppliers, users, or websites, without risking harm to the host machine or operating system. A sandbox can provide a tightly controlled set of resources for guest programs to run in, such as storage and memory scratch space. Network access, the ability to inspect the host system or read from input devices can be disallowed or restricted. UDFs typically can run in a sandbox environment. The optional sandbox environment provides important security isolation for untrusted code execution. It restricts access to resources like storage, memory, and network connectivity to contain untrusted code. Policies can enforce permissions, resource limits, auditing, and multi-tenant isolation when running User Defined Functions (UDFs) from different users. The developer framework delivers a unified interface to the cloud data warehouse for languages like Python and Structured Query Language (SQL). Some example embodiments described herein can be run within a sandbox environment, which is described and depicted in more detail in connection with FIG. 4.

FIG. 1 is an example computing environment 100 illustrating a cloud data platform 102 including a developer framework and programming environment that integrates application development functionality with DataFrame capabilities, in accordance with some embodiments of the present disclosure.

To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of cloud data platform or a cloud data platform. For example, in some aspects, the computing environment 100 may include a cloud computing platform 101 with the cloud data platform 102 and a storage platform 104 (also referred to as a cloud storage platform). The cloud computing platform 101 provides computing resources and storage resources that can be acquired (purchased) or leased and configured to execute applications and store data.

The cloud computing platform 101 may host a cloud computing service 103 that facilitates storage of data on the cloud computing platform 101 (e.g., data management, access, etc.) and analysis functions (e.g., SQL queries, analysis, etc.), as well as other processing capabilities. The cloud computing platform 101 may include a three-tier architecture: data storage (e.g., storage platform 104 and storage platforms 122), an execution platform 110 (e.g., providing query processing), and a compute service manager 108 providing cloud services including services associated with the disclosed functionalities.

In the present disclosure, a cloud data platform 102 (e.g., database system, distributed database system) can support data storage for one or more different organizations (e.g., customer organizations, which can be individual companies or business entities), where each individual organization can have one or more accounts (e.g., customer accounts) associated with the individual organizations, and each account can have one or more users (e.g., unique usernames or logins with associated authentication information). In an example implementation, a cloud data platform includes one or more databases that are maintained on behalf of a customer account (e.g., accounts of one or more data providers). Data can be shared between a provider account, which owns the data, and a consumer account (e.g., receiver account, data consumer, etc.), which can have access to the data using two-way secure data sharing between private and public clouds according to a relationship establishment procedure (e.g., a handshake) to ensure a trust relationship is established between the provider and the consumer. Users or executing processes that are associated with a given customer account can, via one or more types of clients, be able to cause data to be ingested into the database, and can also be able to manipulate the data, add additional data, remove data, run queries against the data, generate views of the data, and so forth. Moreover, it is often the case that data providers are direct customers of a cloud data platform. As examples, data providers can provide one or more types of data, such as financial data (e.g., stock prices), weather data, pandemic test results, vaccination levels, and/or the like. These data providers, using client device(s) 114, typically have one or more customers of their own that consume the data; these entities are referred to in the present disclosure as "data consumer(s) 115" or simply "consumers." In some examples, a data consumer might be a trading house that consumes financial data from a data provider.

Additionally, an individual account can have one or more users that are designated as an administrator for the individual account. An individual account of an organization can be associated with a specific cloud platform (e.g., cloud-storage platform, such as such as AMAZON WEB SERVICES™ (AWS™), MICROSOFT® AZURE®, GOOGLE CLOUD PLATFORM™), one or more servers or data centers servicing a specific region (e.g., geographic regions such as North America, South America, Europe, Middles East, Asia, the Pacific, etc.), a specific version of a data platform, or a combination thereof. A user of an individual account can be unique to the account. Additionally, a cloud data platform can use an organization data object to link accounts associated with (e.g., owned by) an organization, which can facilitate management of objects associated with the organization, account management, billing, replication, failover/failback, data sharing within the organization, and the like.

In a typical implementation, a cloud data platform 102 includes one or more databases that are maintained on behalf of a user account. The cloud data platform 102 may include one or more databases that are respectively maintained in association with any number of user accounts (e.g., accounts of one or more data providers or other types of users), as well as one or more databases associated with a system account (e.g., an administrative account) of the cloud data platform 102, one or more other databases used for administrative purposes, and/or one or more other databases that are maintained in association with one or more other organizations and/or for any other purposes. A cloud data platform 102 may also store metadata (e.g., account object metadata) in metadata database(s) 112 in association with the data platform in general and in association with, for example, particular databases and/or particular user accounts as well. Users and/or executing processes that are associated with a given user account may, via one or more types of clients (e.g., customer environment), be able to cause data to be ingested into the database, and may also be able to manipulate the data, add additional data, remove data, run queries against the data, generate views of the data, and so forth.

It is often the case that organizations that are users of a given data platform also maintain data storage (e.g., a data lake) that is external to the data platform (e.g., one or more external storage locations, external stage 124). For example, a company could be a user of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The user's servers and cloud-storage platforms are both examples of what a given user could use as what is referred to herein as an external storage location. The cloud computing platform 101 could also use a cloud storage platform 104 as what is referred to herein as an internal storage (e.g., internal stage 126) location concerning the data platform.

From the perspective of the cloud data platform 102 of the cloud computing platform 101, one or more files that are stored at one or more storage locations are referred to herein as being organized into one or more of what is referred to herein as either "internal stages 126" or "external stages 124." Internal stages 126 are stages that correspond to data storage at one or more internal storage locations, and internal stages 124 are stages that correspond to data storage at one or more external storage locations. In this regard, external files can be stored in internal stages 124 at one or more external storage locations cloud-storage platforms 122, and internal files can be stored in internal stages 126 at one or more internal storage locations (e.g., cloud storage platform 104), which can include servers managed and controlled by the same organization (e.g., company) that manages and controls the cloud data platform 102, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given user stores at a given external storage location may or may not be stored in an external stage in the external storage location; in some data-platform implementations, it is a user's choice whether to create one or more external stages (e.g., one or more external-stage objects) in the user's data-platform account as an organizational and functional construct for conveniently interacting via the data platform with one or more external files. External stage 124 in the cloud data platform 102 allows customers (e.g., data providers, data consumers, engineers, users, etc.) to load cloud data platform tables from and unload tables into object buckets under the customers' cloud provider accounts. The object bucket can be on the same cloud provider as where the cloud data platform 102 is deployed or on a different cloud provider, as the word "external" highlights the fact that the object bucket resides under the customers' cloud provider accounts.

As shown, the cloud data platform 102 of the cloud computing platform 101 is in communication with the storage platforms 104 and 122 (e.g., AWS®, Microsoft Azure Blob Storage®, or Google Cloud Storage). The cloud data platform 102 is a network-based system used for reporting and analysis of integrated data from one or more disparate sources including one or more storage locations within the storage platform 104. The storage platform 104 comprises a plurality of computing machines and provides on-demand computer system resources such as data storage and computing power to the cloud data platform 102.

The cloud data platform 102 comprises a compute service manager 108, an execution platform 110, and one or more metadata databases 112. The cloud data platform 102 hosts and provides data reporting and analysis services to multiple client accounts.

The compute service manager 108 coordinates and manages operations of the cloud data platform 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device(s) 114. The client device(s) 114 correspond to a user of one of the multiple client accounts (e.g., data provider accounts) supported by the cloud data platform 102. A user may utilize the client device 114 to submit data storage, retrieval, and analysis requests to the compute service manager 108. Client device 114 (also referred to as a user device) may include one or more of a laptop computer, a desktop computer, a mobile phone (e.g., a smartphone), a tablet computer, a cloud-hosted computer, cloud-hosted serverless processes, or other computing processes or devices that may be used to access services provided by the cloud computing platform 101 (e.g., cloud computing service 103) by way of a network 106, such as the Internet or a private network. The developer can write code (e.g., developer framework and programming environment Python code) in a local development environment of the client device(s) 114, a Python worksheet in the query user interface of the cloud data platform, a client application, client environment 116, or the like. For example, a developer (e.g., a data engineer of a data provider using client environment 116 on client device(s) 114) can set up the user's preferred development environment and establish a session to interact with the cloud data platform 102. For example, example embodiments can include a client environment (e.g., client component), such as a cloud data platform Java Database Connectivity (JDBC) or cloud data platform Open Database Connectivity (ODBC) client used to connect to the cloud computing platform 101, such as any of the cloud data platform system, components, facilities, and/or applications.

A client, such as a presentation client, could reside on a client-side computing device on which the client interacts with one or more client-side applications and on which the client makes use of certain client-side-system resources such as network interfaces, user interfaces, memory (e.g., random access memory (RAM)), and/or the like. The client environment 116 can include a developer framework 140 to form a user-friendly abstraction layer over underlying data and uses a DataFrame API call 144 to transmit a query, such as SQL query 138 that includes dynamic pivot functionality, transmitted to the cloud data platform 102 via network 106.

According to example embodiments, the cloud data platform 102 is operatively connected to a developer framework and programming environment (also referred to throughout the disclosure as the "developer framework" or simply, "the framework") that enables data engineers, data scientists, developers, or other users to build complex data pipelines and processes using common programming languages, such as Python, Scala, Java, or the like. The developer framework 140 allows developers to directly interact with the cloud data platform 102 to run queries, such as SQL query 138, and operations without having to extract and move data out of the platform. The developer framework 140 provides libraries and runtimes to securely execute non-SQL code within the cloud data platform 102. With the developer framework 140, developers can construct DataFrame queries and transformations programmatically in their code via the client environment 116. The developer framework 140 dynamically generates the underlying SQL code to execute against the cloud data platform 102 in a robust and schema-driven manner. The developer framework 140 simplifies building complex pipelines and provides developers direct data access, in some examples, avoiding extract, transform, and load (ETL) steps.

The compute service manager 108, or other component of the cloud data platform 102, provides a developer framework to enable Python (or other programming languages)

programming directly against platform data and services. Example embodiments include reading data into platform native DataFrames and PANDAS-compatible DataFrames; leveraging Python data transformations, scripts, and libraries; writing data back to the platform; creating and invoking custom Python user-defined functions and stored procedures; and applying Python machine learning models for predictive analytics. This deeply integrated Python (other programming languages) programming experience allows developers, via client device(s) 114 and developer framework 140, to build complex analytical workflows that leverage both the flexibility of Python and the scale, concurrency, and performance of the cloud data platform 102. The developer framework 140 eliminates extract, transform, and load burdens, enables code re-use and portability, and brings advanced analytics like predictive modeling directly to data residing on the cloud data platform. By bridging Python (or other programming languages) and SQL programming styles, the developer framework 140 boosts developer productivity and advanced analytic capability for the cloud data platform.

The developer framework 140 can include a function invocation provided by a DataFrame library, such as PANDAS or Spark®, which implements operations on the DataFrame for data tasks. Dataframe libraries implement a functional abstraction layer enabling users to manipulate in-memory tabular data structures known as DataFrames. This is provided via an expressive application programming interface (API) of functions and methods tailored for data preparation, transformation, analysis, and visualization tasks. Dataframe APIs allow accessing, filtering, aggregating, pivoting, joining and otherwise operating on DataFrame data using concise and intuitive syntax. The API calls, such as DataFrame API call 144, map to underlying queries, such as SQL query 138, and data processing engines (not shown) in the client environment 116 and/or the server environment 118. According to some examples of the developer framework 140, examples of client APIs for invoking the dynamic pivot capability include, for example: developer framework Python API as df.pivot( ), developer framework Scala API as df.pivot( ), developer framework Java API as DataFrame.pivot( ), cloud data platform SQL as PIVOT syntax, developer framework R API as pivot_table( ).

According to additional examples, during distributed execution, shuffle operations and data exchanges work as follows: the initial group by aggregations are computed locally on each worker's data partitions, this intermediate aggregated data is shuffled across nodes to compute the object aggregation, and the object aggregation output is partitioned again and shuffled to materialize the final pivot columns. Data partitioning schemes optimize shuffle sizes between stages to minimize data exchange and a resource manager, such as a cluster resource manager, handles routing of all intermediate shuffle data exchanges between worker nodes. Examples of shuffle operations exchange intermediate results between stages of distributed aggregation and materialization to efficiently compute the pivot across massive datasets.

In other examples, a JDBC or ODBC driver can exist on a server-side of the cloud data platform 102, such as server environment 118. For example, the server environment 118 can include a presentation server implementation code that provides server-side functionality via the network 106 to the client environment 116. In some embodiments, the user of the client device(s) 114 can be a data provider configured to provide services to other users, such as data consumers 115. While certain functions of the computing environment 100 are described herein as being performed by either a client environment 116 or by the server environment 118, the location of certain functionality either within the client environment 116 or the server environment 118 may be a design choice. For example, it may be technically preferable to initially deploy particular technology and functionality within the server environment 118 but to later migrate this technology and functionality to the client environment 116 where a user system, such as the client device(s) 114, has sufficient processing capacity.

In the description below, actions are ascribed to users of the cloud data platform. Such actions shall be understood to be performed concerning client device(s) 114 (or a singular client device) operated by such users. For example, a notification to a user may be understood to be a notification transmitted to the client device(s) 114, input or instruction from a user may be understood to be received by way of the client device(s) 114, and interaction with an interface by a user shall be understood to be interaction with the interface on the client device(s) 114. In addition, database operations (e.g., joining, aggregating, analysis, etc.) ascribed to a user of the cloud data platform shall be understood to include performing such actions by the cloud computing service 103 in response to an instruction from that user.

The compute service manager 108 is also coupled to one or more metadata databases 112 that store metadata about various functions and aspects associated with the cloud data platform 102 and its users. For example, the one or more metadata databases 112 may include a summary of data stored in remote data storage systems as well as data available from a local cache. Additionally, the one or more metadata databases 112 may include information regarding how data is organized in remote data storage systems (e.g., the storage platform 104) and the local caches. Information stored by the one or more metadata databases 112 allows systems and services to determine whether a piece of data needs to be accessed without loading or accessing the actual data from a storage device. In some embodiments, the one or more metadata databases 112 are configured to store account object metadata (e.g., account objects used in connection with a replication group object).

Figure 3:
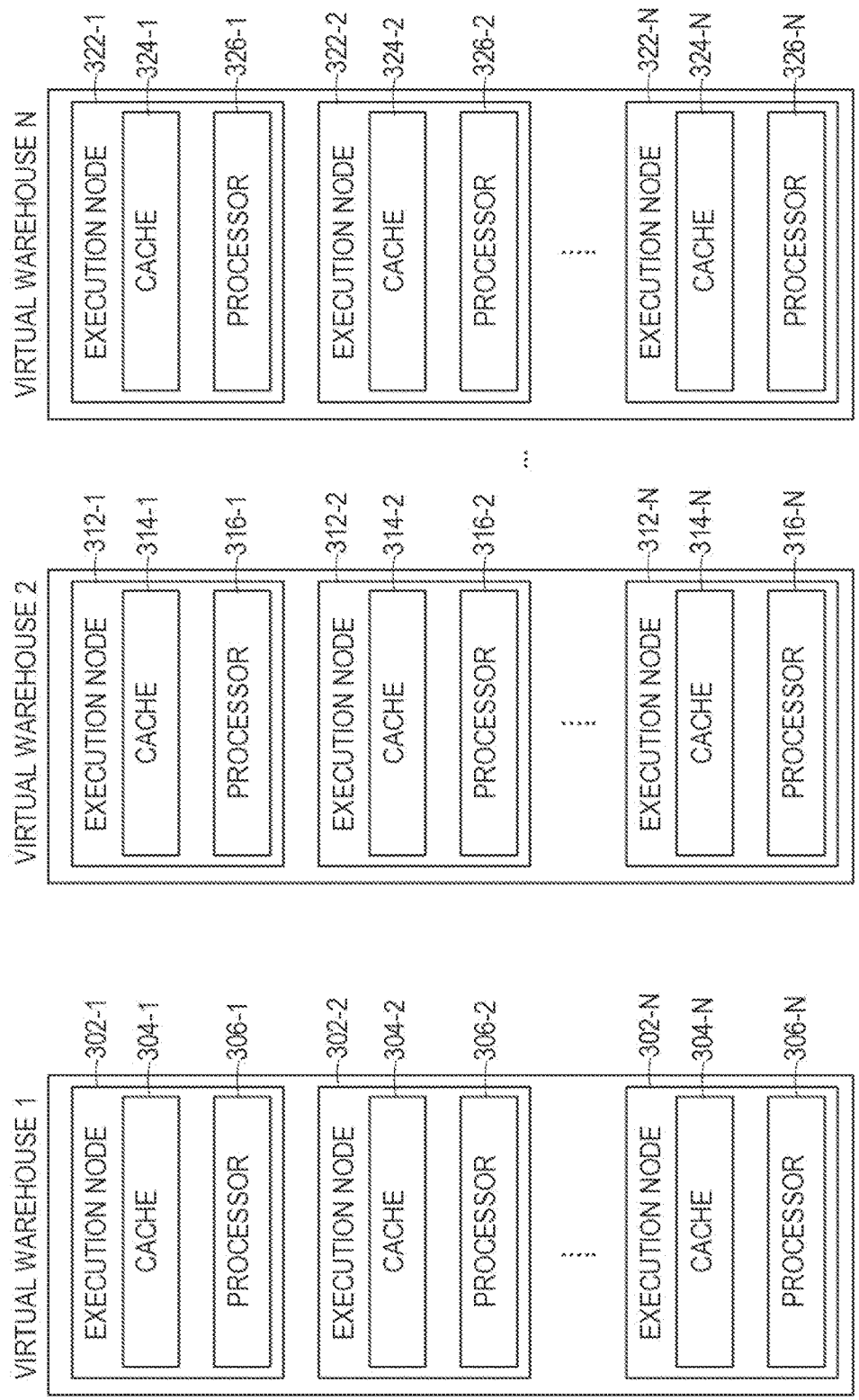
FIG. 3 is a block diagram illustrating components of an execution platform, according to some example embodiments.

The compute service manager 108 is further coupled to the execution platform 110, which provides multiple computing resources that execute various data storage and data retrieval tasks. As illustrated in FIG. 3, the execution platform 110 comprises a plurality of compute nodes. The execution platform 110 is coupled to storage platform 104 and cloud-storage platforms 122*a*, 122*b* . . . , 122*c* (collectively referred to as storage platforms 122). The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the storage platform 104 may include distributed file systems (such as Hadoop Distributed File Systems (HDFS)), object storage systems, and the like. In some embodiments, at least one internal stage 126 may reside on one or more of the data storage devices 120-1-120-N, and an external stage 124 may reside on one or more of the storage platforms 122.

Figure 2:
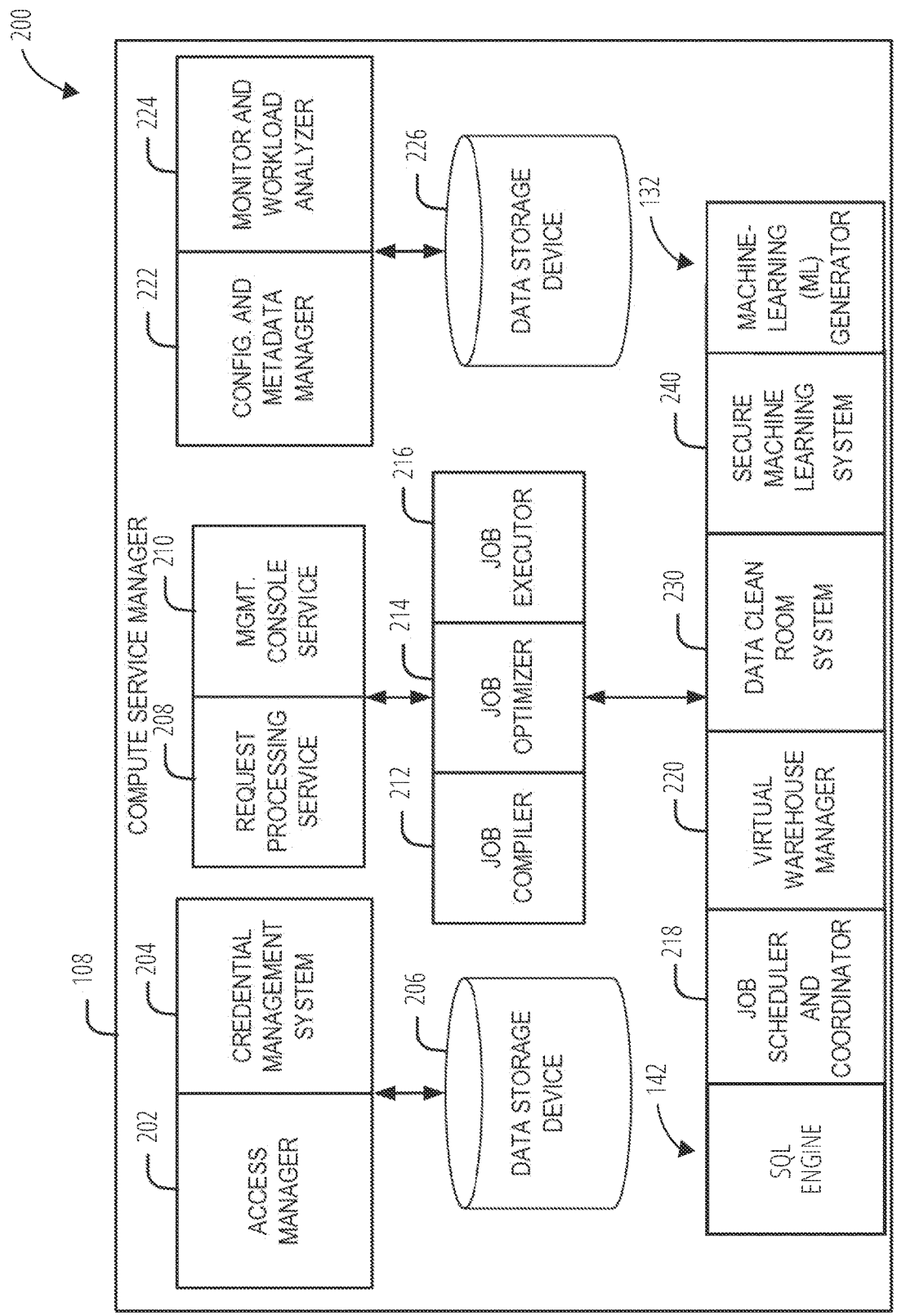
FIG. 2 is a block diagram illustrating components of a compute service manager, according to some example embodiments.

In some embodiments, the cloud data platform 102 includes a machine-learning (ML) generator 132. The ML generator 132 comprises suitable circuitry, interfaces, logic, and/or code and is configured to provide generation of ML models for extracting information from one or more documents (e.g., electronic documents) according to various embodiments. In some embodiments, the ML generator 132 can include one or more system functions that can be used to implement a method of generating an ML model as described herein. In some examples, the ML generator 132 can be operatively interconnected to the compute service manager 108, within the compute service manager 108 (as depicted in FIG. 2), connected to the execution platform 110, connected to the meta database(s) 112, or otherwise connected within or operatively to the cloud data platform 102 via additional external connections.

The execution platform 110 comprises a plurality of compute nodes. A set of processes on a compute node executes a query plan compiled by the compute service manager 108. Examples of the query plan can be generated and consumed in execution platform 110 by an RSO, table scan, or another scanner layer. The query plan can be built from an execution plan to extract from files, such as micropartition files (e.g., horizontal (grouped by rows) partition of data within a database) and the columns consumed, and as needed, materialize (e.g., build) columns that are sharded in sub-columns, and convert the data when it needs to be cast to a different but compatible data types. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The compute service manager 108, the one or more metadata databases 112, the execution platform 110, and the storage platform 104, are shown in FIG. 1 as individual discrete components. However, each of the compute service manager 108, the one or more metadata databases 112, execution platform 110, and storage platform 104 may be implemented as a distributed system (e.g., distributed across multiple systems/platforms at multiple geographic locations). Additionally, each of the compute service manager 108, the one or more metadata databases 112, execution platform 110, and storage platform 104 can be scaled up or down (independently of one another) depending on changes to the requests received and the changing needs of the cloud data platform 102. Thus, in the described embodiments, the cloud data platform 102 is dynamic and supports regular changes to meet the current data processing needs.

During a typical operation, the cloud data platform 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be good candidates for processing the task. Metadata stored in the one or more metadata databases 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the storage platform 104. It is desirable to retrieve as much data as possible from caches within the execution platform 110 because the retrieval speed is typically much faster than retrieving data from the storage platform 104.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. Concerning the type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems.

In a typical implementation, a cloud data platform 102 can include one or more databases that are respectively maintained in association with any number of customer accounts (e.g., accounts of one or more data providers), as well as one or more databases associated with a system account (e.g., an administrative account) of the data platform, one or more other databases used for administrative purposes, and/or one or more other databases that are maintained in association with one or more other organizations and/or for any other purposes. A cloud data platform 102 may also store metadata (e.g., account object metadata) in association with the data platform in general and in association with, for example, particular databases and/or particular customer accounts as well. Users and/or executing processes that are associated with a given customer account may, via one or more types of clients, be able to cause data to be ingested into the database, and may also be able to manipulate the data, add additional data, remove data, run queries against the data, generate views of the data, and so forth. As used herein, the terms "account object metadata" and "account object" are used interchangeably.

In an implementation of a cloud data platform 102, a given database (e.g., a database maintained for a customer account) may reside as an object within, e.g., a customer account, which may also include one or more other objects (e.g., users, roles, grants, shares, warehouses, resource monitors, integrations, network policies, and/or the like). Furthermore, a given object such as a database may itself contain one or more objects such as schemas, tables, materialized views, and/or the like. A given table may be organized as a collection of records (e.g., rows) so that each includes a plurality of attributes (e.g., columns). In some implementations, database data is physically stored across multiple storage units, which may be referred to as files, blocks, partitions, micro-partitions, and/or by one or more other names. In many cases, a database on a data platform serves as a backend for one or more applications that are executing on one or more application servers.

A database can include a repository of data for a customer of the cloud data platform, where the data is stored in tables that can be managed and queried. A database of the cloud data platform holds a collection of schemas, and a schema holds a collection of objects that can be tables and views. For example, a table stores data and can be queried. A view is a logical grouping (e.g., a SQL query) to create a virtual table that can be queried as if it was a real (e.g., non-virtual) table. A view may include, for example, a materialized view, which is a special view that provides a faster way to access tables. The materialized view is backed by physical (e.g., hidden) tables that can use different key orderings.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the storage platform 104. Thus, the computing resources and cache resources are not restricted to specific data storage devices 120-1 to 120-N. Instead, all computing resources and all cache resources may retrieve data from, and store data to, any of the data storage resources in the storage platform 104.

FIG. 2 is a block diagram 200 illustrating components of the compute service manager 108, in accordance with some embodiments of the present disclosure. As shown in FIG. 2, the compute service manager 108 includes an access manager 202 and a credential management system 204 coupled to data storage device 206, which is an example of the metadata databases 112. Access manager 202 handles authentication and authorization tasks for the systems described herein.

The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the data storage device 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the data storage device 206 (e.g., access metadata database, a credential object, and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in cloud storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110 of FIG. 1. For example, jobs may be prioritized and then processed in the prioritized order. In an embodiment, the job scheduler and coordinator 218 determines a priority for internal jobs that are scheduled by the compute service manager 108 of FIG. 1 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries, requests, or the like.

As illustrated, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the cloud data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 represents any data storage device within the cloud data platform 102. For example, data storage device 226 may represent buffers in execution platform 110, storage devices in cloud storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 of FIG. 3) may need to communicate with another execution node (e.g., execution node 302-2 of FIG. 3), but should be disallowed from communicating with a third execution node (e.g., execution node 312-1), and any such illicit communication can be recorded (e.g., in a log or other location). Also, the information stored on a given execution node is restricted to data relevant to the current query, and any other data is unusable, rendered so by destruction or encryption where the key is unavailable.

The data clean room system 230 allows for dynamically restricted data access to shared datasets. Data clean room is one part of data sharing and is just one example of the marketplace.

The compute service manager 108 can include a SQL engine 142 and/or be operatively connected to the SQL engine 142 configured to generate dynamic pivot functionality via a database system backend, such as the server environment 118 or the SQL engine 142, transforms data into optimized queries using object aggregation, deterministic ordering, or the like to efficiently compute results of the SQL query 138 including the dynamic pivot, in accordance with example embodiments of the present disclosure.

As previously mentioned, the compute service manager 108 can include the ML generator 132 and/or be operatively interconnected to the ML generator 132 configured to generate ML model for extracting information from one or more documents according to various embodiments. As explained throughout, in some example embodiments, the ML generator 132 can be integrated into a database clean room, and/or used in conjunction with, parallel to, or in combination with a secure machine learning system 240 as depicted and described above with reference to FIG. 2. The database clean room enables two or more end-users of the cloud data platform 102 to share and collaborate on their sensitive data, without directly revealing that data to other participants. In alternative example embodiments, the ML generator 132 can be configured externally from compute service manager 108 and from cloud data platform 102, instead being operatively interconnected via one or more layers.

FIG. 3 is a block diagram 300 illustrating components of the execution platform 110 of FIG. 1, in accordance with some embodiments of the present disclosure. As shown in FIG. 3, the execution platform 110 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 102-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104 of FIG. 1. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet, another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location. A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer useful.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

Figure 4:
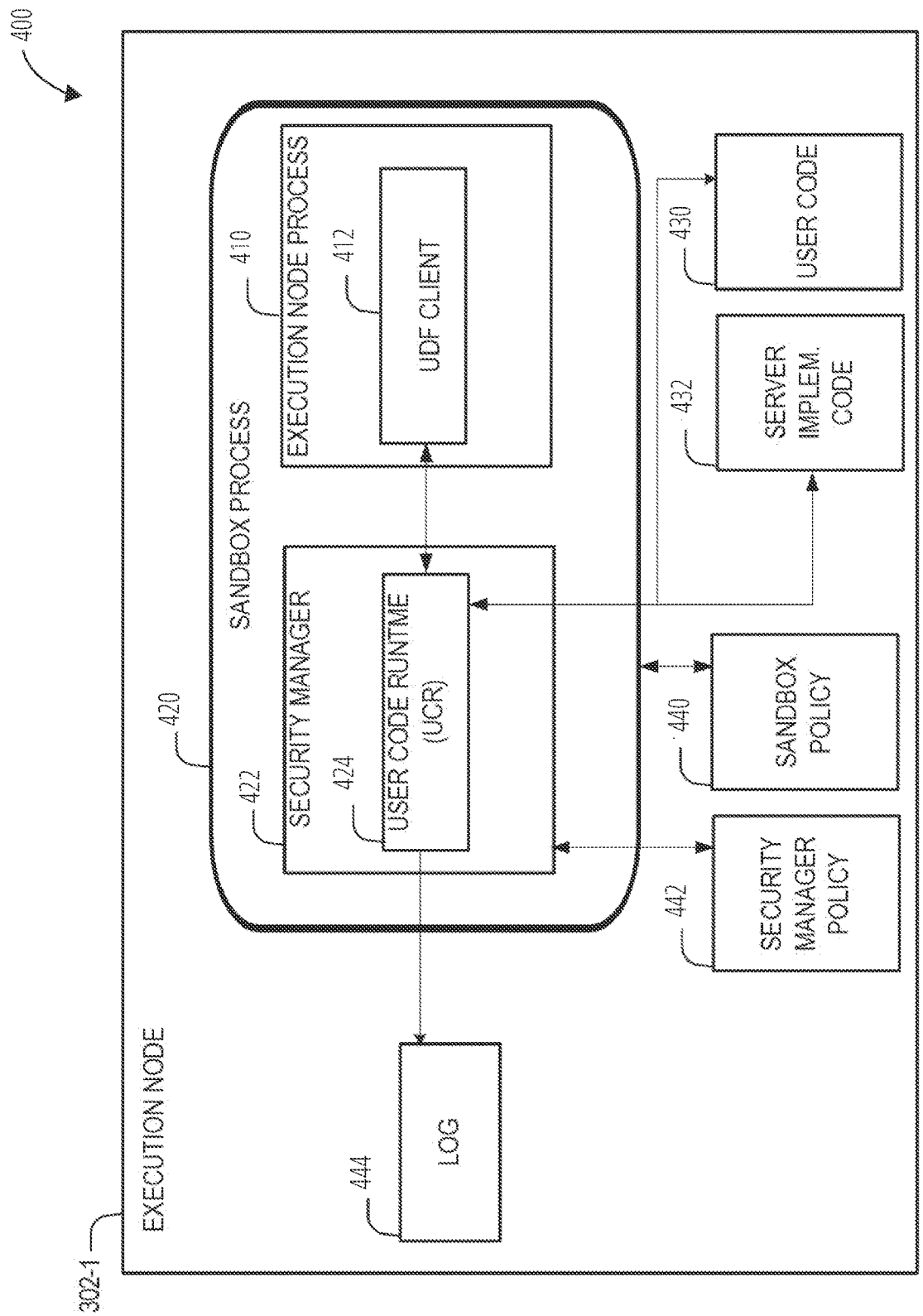
FIG. 4 is a computing environment conceptually illustrating an example software architecture executing a user defined function (UDF) by a process running on a given execution node of the execution platform, according to some example embodiments.

FIG. 4 is a computing environment 400 conceptually illustrating an example software architecture executing a user-defined function (UDF) by a process running on a given execution node of the execution platform 110 of FIG. 3, in accordance with some embodiments of the present disclosure.

As illustrated, the execution node 302-1 from the execution platform 110 includes an execution node process 410, which in an embodiment is running on the processor 306-1 and can also utilize memory from the cache 304-1 (or another memory device or storage). As mentioned herein, a "process" or "computing process" can refer to an instance of a computer program that is being executed by one or more threads by an execution node or execution platform.

As mentioned before, the compute service manager 108 of FIG. 1 validates all communication from the execution platform 110 of FIG. 1 to validate that the content and context of that communication are consistent with the task(s) known to be assigned to the execution platform 110. For example, the execution platform 110 executing a query A is not allowed to request access to a particular data source (e.g., data storage device 226 of FIG. 2 or any one of the storage devices in the cloud storage platform 104) that is not relevant to query A. In an example, the execution node 302-1 may need to communicate with a second execution node (e.g., execution node 302-2), but the security mechanisms described herein can disallow communication with a third execution node (e.g., execution node 312-1). Moreover, any such illicit communication can be recorded (e.g., in a log 444 or other location). Further, the information stored on a given execution node is restricted to data relevant to the current query and any other data is unusable by destruction or encryption where the key is unavailable.

The execution node process 410 is executing a UDF client 412 in the example of FIG. 4. In an embodiment, the UDF client 412 is implemented to support UDFs written in a particular programming language such as JAVA, and the like. In an embodiment, the UDF client 412 is implemented in a different programming language (e.g., C or C++) than the user code 430, which can further improve security of the computing environment 400 by using a different codebase (e.g., one with the same or fewer potential security exploits).

User code 430 may be provided as a package, e.g., in the form of a JAR (JAVA archive) file which includes code for one or more UDFs (e.g., extension functions). Server implementation code 432, in an embodiment, is a JAR file that initiates a server which is responsible for receiving requests from the execution node process 410, assigning worker threads to execute user code, and returning the results, among other types of server tasks.

In an implementation, an operation from a UDF (e.g., JAVA-based UDF) can be performed by a user code runtime 424 executing within a sandbox process 420. In an embodiment, the user code runtime 424 is implemented as a virtual machine, such as a JAVA virtual machine (JVM). Since the user code runtime 424 executes in a separate process relative to the execution node process 410, there is a lower risk of manipulating the execution node process 410. Results of performing the operation, among other types of information or messages, can be stored in a log 444 for review and retrieval. In an embodiment, the log 444 can be stored locally in memory at the execution node 302-1, or at a separate location such as the cloud storage platform 104.

Examples of the log 444 can include logging for observability and debuggability. Logging can be automatically configured to observe egress traffic using a logging mechanism with runtime-configurable verbosity levels. For example, use of an event output log or event output helper can allow for passing custom structs from the eBPF program to a performance event ring buffer along with an optional packet sample. In response, the execution platform worker can pull the logs from log 444 or other logs from the buffer and write to execution platform logs, as an example. This channel can be used to log, debug, sample, and/or push notifications for network policy violations and the like. For example, the event output log or helper can be configured to pass the data through a lockless memory mapped per-CPU performance ring buffer, which is significantly faster (e.g., more efficient) than default logging support in eBPF.

Additional examples of the log 444 or other logs of the cloud data platform 102 can be used to provide clear and actionable feedback necessary for users if their UDF's packet has been blocked. With the logging mechanism, the cloud data platform 102 or component thereof can report details back to the user (e.g., which IP and port has been blocked or violated the account policy). Additionally, when an unauthorized DNS request has been blocked, the eBPF program can intercept the packet and report back which hostname it tried to access and enter such information into the log 444, which is valuable for helping customers to troubleshoot and debug their UDF.

Moreover, such results can be returned from the user code runtime 424 to the UDF client 412 utilizing a high-performance protocol (e.g., without serialization or deserialization of data, without memory copies; operates on record batches without having to access individual columns, records, or cells, utilizes efficient remote procedure call techniques and network protocol(s) for data transfer) for data transfer (e.g., distributed datasets) that further provides authentication and encryption of the data transfer. In an embodiment, the UDF client 412 uses a data transport mechanism that supports a network transfer of columnar data between the user code runtime 424 (and vice-versa).

Security manager 422, in an example, can prevent completion of an operation from a given UDF by throwing an exception (e.g., if the operation is not permitted), or returns (e.g., doing nothing) if the operation is permitted. In an implementation, the security manager 422 is implemented as a JAVA security manager object that allows applications to implement a security policy such as a security manager policy 442, and enables an application to determine, before performing a possibly unsafe or sensitive operation, what the operation is and whether it is being attempted in a security context that allows the operation to be performed. The security manager policy 442 can be implemented as a file with permissions that the user code runtime 424 is granted. The application (e.g., UDF executed by the user code runtime 424) therefore can allow or disallow the operation based at least in part on the security policy.

Sandbox process 420, in an embodiment, is a sub-process (or separate process) from the execution node process 410.

A sub-process, in an embodiment, refers to a child process of a given parent process (e.g., in this example, the execution node process 410). The sandbox process 420, in an example, is a program that reduces the risk of security breaches by restricting the running environment of untrusted applications using security mechanisms such as namespaces and secure computing modes (e.g., using a system call filter to an executing process and all its descendants, thus reducing the attack surface of the kernel of a given operating system). Moreover, in an example, the sandbox process 420 is a lightweight process in comparison to the execution node process 410 and is optimized (e.g., closely coupled to security mechanisms of a given operating system kernel) to process a database query in a secure manner within the sandbox environment.

For example, the instance of a computer program can be instantiated by the execution platform 110. For example, the execution node 302-1 can be configured for instantiating a user code runtime to execute the code of the UDF and/or to create a runtime environment that allows the user's code to be executed. The user code runtime can include an access control process including an access control list, where the access control list includes authorized hosts and access usage rights or other types of allow lists and/or block lists with access control information. Instantiating a sandbox process can determine whether the UDF is permitted and instantiating the user code runtime as a child process of the sandbox process, the sandbox process configured to execute the at least one operation in a sandbox environment.

In an embodiment, the sandbox process 420 can utilize a virtual network connection in order to communicate with other components within the subject system. A specific set of rules can be configured for the virtual network connection with respect to other components of the subject system. For example, such rules for the virtual network connection can be configured for a particular UDF to restrict the locations (e.g., particular sites on the Internet or components that the UDF can communicate) that are accessible by operations performed by the UDF. Thus, in this example, the UDF can be denied access to particular network locations or sites on the Internet.

The sandbox process 420 can be understood as providing a constrained computing environment for a process (or processes) within the sandbox, where these constrained processes can be controlled and restricted to limit access to certain computing resources.

Examples of security mechanisms can include the implementation of namespaces in which each respective group of processes executing within the sandbox environment has access to respective computing resources (e.g., process IDs, hostnames, user IDs, file names, names associated with network access, inter-process communication, and the like) that are not accessible to another group of processes (which may have access to a different group of resources not accessible by the former group of processes), other container implementations, and the like. By having the sandbox process 420 execute as a sub-process to the execution node process 410, in some embodiments, latency in processing a given database query can be substantially reduced (e.g., a reduction in latency by a factor of 10× in some instances) in comparison with other techniques that may utilize a virtual machine solution by itself.

As further illustrated, the sandbox process 420 can utilize a sandbox policy 440 to enforce a given security policy. The sandbox policy 440 can be a file with information related to a configuration of the sandbox process 420 and details regarding restrictions, if any, and permissions for accessing and utilizing system resources. Example restrictions can include restrictions to network access, or file system access (e.g., remapping file system to place files in different locations that may not be accessible, other files can be mounted in different locations, and the like). The sandbox process 420 restricts the memory and processor (e.g., CPU) usage of the user code runtime 424, ensuring that other operations on the same execution node can execute without running out of resources.

As mentioned above, the sandbox process 420 is a subprocess (or separate process) from the execution node process 410, which in practice means that the sandbox process 420 resides in a separate memory space than the execution node process 410. In an occurrence of a security breach in connection with the sandbox process 420 (e.g., by errant or malicious code from a given UDF), if arbitrary memory is accessed by a malicious actor, the data or information stored by the execution node process is protected.

Although the above discussion of FIG. 4 describes components that are implemented using JAVA (e.g., an object-oriented programming language), it is appreciated that the other programming languages (e.g., interpreted programming languages) are supported by the computing environment 400. In an embodiment, PYTHON is supported for implementing and executing UDFs in the computing environment 400. In this example, the user code runtime 424 can be replaced with a PYTHON interpreter for executing operations from UDFs (e.g., written in PYTHON) within the sandbox process 420.

Figure 5:
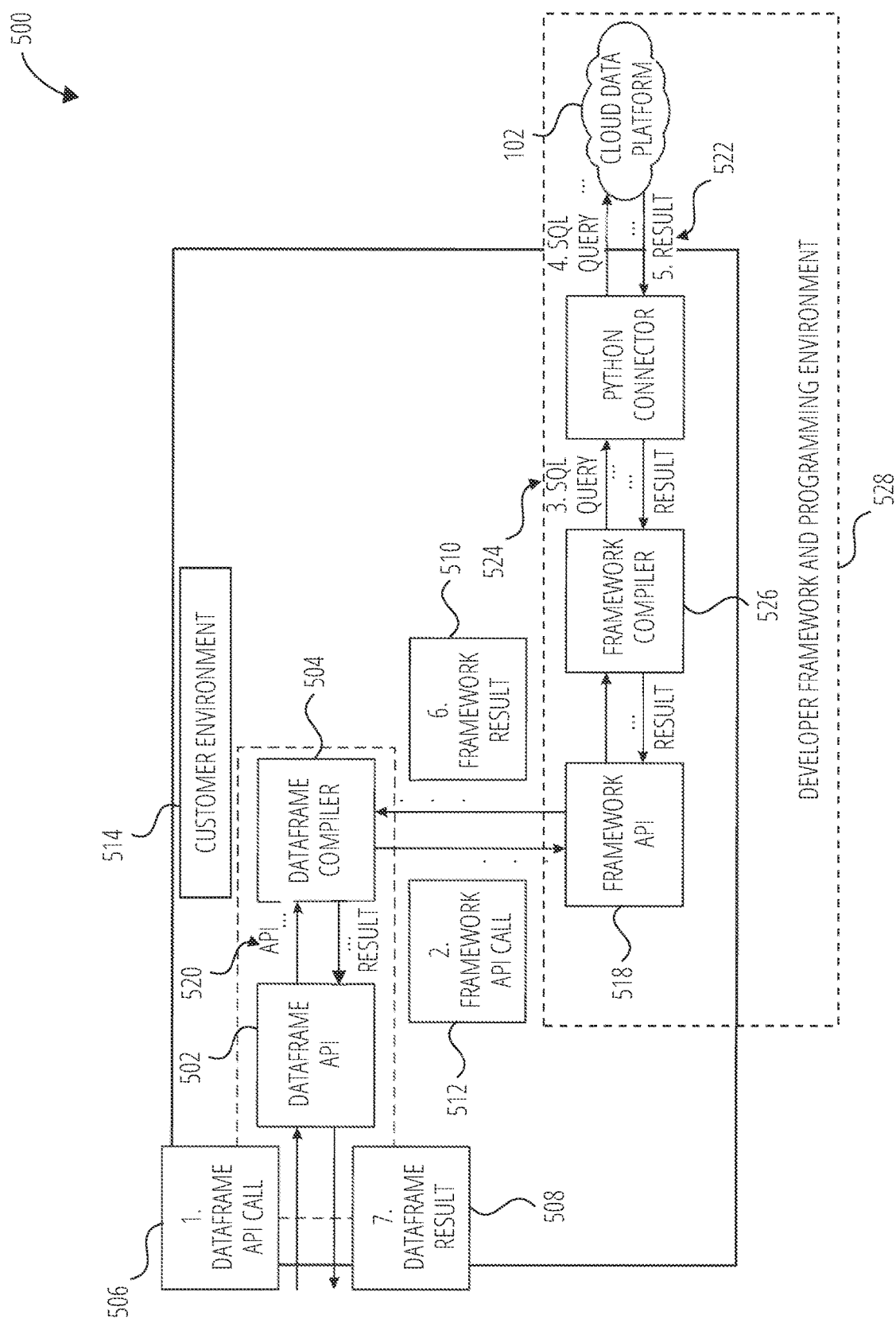
FIG. 5 is a block diagram illustrating an example of a customer environment that includes a DataFrame API layer and a DataFrame compiler layer, according to some example embodiments.

FIG. 5 is a block diagram 500 illustrating an example of a customer environment 514 that includes a DataFrame API 502 layer and a DataFrame compiler 504 layer of the developer framework and programming environment of the cloud data platform, in accordance with example embodiments.

Example embodiments of the developer framework and programming environment 528 of the cloud data platform include a DataFrame API 502 to allow users of the cloud data platform 102 to write data pipelines quickly and effectively for a diverse set of scenarios ranging from interactive analytics to complex batch workloads directly against data in the cloud data platform at scale. The DataFrame API 502 performs any operations remotely on the cloud data platform, where the DataFrame API 502 builds upon the developer framework and programming environment DataFrames and provides an additional, higher-level API employing PANDAS-compatible semantics (e.g., style) in the customer environment 514.

The block diagram 500 provides a DataFrame workflow in the customer environment 514, where the DataFrame workflow illustrates an example of end-to-end sequence for manipulating DataFrame data structures within the programming environment. The DataFrame workflow employs consistent semantics (e.g., results behave as if loaded into memory and are not affected by underlying data changes) and deterministic row ordering (e.g., the same queries produce the same results in the same order). The DataFrame workflow begins with a customer (e.g., user) making a DataFrame API call 506 through the DataFrame API 502 to invoke an operation or function on a DataFrame.

Example embodiments of the DataFrame API 502 provides an interface to allow users to manipulate DataFrame data structures within the cloud data platform 102, such as translating operations and functions invoked on DataFrames into equivalent SQL queries. The DataFrame API 502 can further allow a user to leverage familiar DataFrame semantics from libraries like PANDAS, enable performing common data manipulation operations like filtering, aggregations, joins, etc. on large dataset scales, handle pushing operations down into the distributed query execution engine, manage consistency semantics around data snapshots so operations use a consistent view, generate deterministic row ordering based on underlying data layout, facilitate building data pipelines and analysis workflows natively within the data platform, and the like.

Examples of the DataFrame API 502 include a programmatic interface enabling developers to work with tabular, relational data structures directly at scale within the cloud data platform, rather than needing to extract data or use external engines. It bridges the gap between standard DataFrame manipulations and a distributed SQL query engine.

The DataFrame API 502, or other client-side code, handles (e.g., transmits) the API request 520 to a DataFrame compiler 504. The DataFrame compiler 504 analyzes and parses DataFrame API calls made by a user to translate the DataFrame API call 506 into equivalent SQL queries and operations into a distributed query execution engine. In some examples, the DataFrame compiler 504 manages deterministic row ordering in the generated SQL based on, for example, underlying data layout, as well as handling consistency semantics around data snapshots and optimizing the SQL queries for efficient processing. The DataFrame compiler 504 acts as a logic layer between the user facing DataFrame API 502 and an underlying SQL execution engine, such as the SQL engine 142, or, more generally, between the DataFrame API 502 and the developer framework and programming environment 528.

The DataFrame workflow in the block diagram 500 continues by making a framework API call 512 to the framework API 518, using the framework compiler 526 to translate the API calls to operations from the developer framework and programming environment 528 to the cloud data platform 102. The operations are performed on the cloud data platform 102, and a result 522 is provided back through the developer framework and programming environment 528 including a framework result 510, which is translated at the DataFrame compiler 504 and/or the DataFrame API 502 into a DataFrame result 508 for presentation to the user.

According to example embodiments, the user (e.g., developer) can query, process, and/or transform data in a variety of ways using the developer framework and programming environment. For example, the user can convert custom lambdas (e.g., small anonymous functions) and functions to user-defined functions (UDFs) that can be called to process data, write a user-defined tabular function (UDTF) that processes data and returns data in a set of rows with one or more columns, write a stored procedure to be called to process data or automate with a task to build a data pipeline, query, and process data with a DataFrame object, or the like. The developer framework and programming environment client environment (e.g., client) brings DataFrame-style programming to multiple programming languages in order to simplify developer building of complex data pipelines and allows developers to interact with the cloud data platform directly without moving data.

The DataFrame API of the cloud data platform translates DataFrame operations to cloud data platform SQLs, which allow users to combine easily custom SQL code with convenient Python abstractions. Some DataFrame operations require new SQL primitives in the cloud data platform, including SQL primitives based on their priorities. The DataFrame API can include a primitive running index, for example, a row position column implementation. In some examples, the DataFrame API can include a primitive running index that may be implemented through a pseudo-column holding the contents equivalent to a deterministic row position. For example, every DataFrame has a column index to keep track of the order of rows. This is because every DataFrame allowing positional indexing can in one way keep track of the order and position of individual rows, for example, typically done through an index. In order to incorporate this tracking into the cloud data platform, an index column is generated, although other options are applicable. For example, an efficient solution for this is an explicit index column that may be optimized or compressed through adequate auxiliary data structures. Per default, whenever any input without a designated index column is read, an index corresponding to a column running from 0 . . . n−1 is generated for n rows.

A database system, such as the cloud data platform, includes a built-in SQL function called SEQ8( ) (noting these have a variety of names, such as monotonically_increasing_id, etc.), which stands for Sequence 8-byte. SEQ8( ) generates monotonically increasing 64-bit integer values, starting at 1 and incrementing by 1 for each row. It provides useful sequencing capability but has some key limitations that the proposed RUNNING_INDEX invention addresses. For example, SEQ8( ) can produce gaps and/or duplicates in the values it generates across rows. It does not guarantee consecutive, contiguous numbering, or deterministic numbering. Each SQL query session obtains its own sequence counter from SEQ8( ). Different queries will interleave values. Because gaps can occur and values reset per session, using SEQ8( ) does not allow repeatable, reliable row numbering needed for positional indexing. In one example for working around an index column, the cloud data platform uses SEQ8( ) directly, for example: SELECT SEQ8( ) AS <index name>, * FROM (<query>). However, the generated sequence may not be gap-free, in which case a component of the cloud data platform uses windowing to secure a consecutive integer sequence starting from zero (0). For example, SELECT * FROM (SELECT ROW_NUMBER( )−1 OVER (ORDER BY SEQ8( ) ASC) AS <index name>, * FROM (<query>)). This ensures a gap-free monotonically increasing sequence.

However, such a workaround that executes SEQ8( ) together with the windowing and a recursive query may be slow and non-deterministic, and an additional example embodiment can be used to have a running index support in the cloud data platform, where the running index support can generate a gap-free monotonically increasing sequence 0, . . . , n−1 and ensures decent performance. For example, SELECT RUNNING_INDEX( ) AS <index name>, * FROM (<query>). According to example embodiments presented herein, the DataFrame API includes a running index (e.g., RUNNING_INDEX( )) SQL extension that generates a gapless, strictly monotonically increasing sequence without resets or gaps. It provides reliable, deterministic row numbering that enables positional and order dependent DataFrame operations.

In some examples, additional global functions can be added. A global function refers to adding a new SQL function that can be used globally in queries to generate row numbers, similar to the ROW_NUMBER( ) window function but not limited in scope like a window function. The key difference between a regular SQL function and a window function is that a regular SQL function operates on the entire result set and calculates a value per row. A window function operates on a subset of rows with respect to the current partition (e.g., like a sliding window) and calculates a value per row based on the window. For example, the current partition as used in most window functions allow for a PARTITION BY clause; if there is no PARTITION BY clause, each row forms its own partition. A global function can be used more flexibly across entire queries while a window function applies to a specific window of rows. The global function can be similar to the existing window function ROW_NUMBER( ) and to match the semantics of the window function should generate a sequence 1, . . . , n. An example syntax for the global function can include, for example: SELECT (ROW_NUMBER( )−1) AS <index name>, * FROM (<query>). Other examples may include, RUNNING_INDEX( ), which can directly generate the desired sequence 0, . . . , n−1. For example, SELECT RUNNING_INDEX( ) AS <index name>, * FROM (<query>). According to some examples, the difference between a global ROW_NUMBER( ) function and RUNNING_INDEX( ) is that a global ROW_NUMBER( ) can be computed based on the result-set. Yet, the RUNNING_INDEX( ) is computed based on the input table/view. They won't necessarily produce the same results, (e.g., when a filter is used).

The SQL primitives in the DataFrame API can include additional implementation examples, such as running index on a base table, an index assignment without ordering (e.g., the running index expression can be written where it is ordered by a constant expression), materialize table with row_index (e.g., materialize tables with generated row indexes when the table is accessed for the first time in a session), sort on file metadata information (e.g., during table scan along with normal columns populate some pseudo/metadata columns), sort on index column, primary key, unique columns or on all columns (e.g., ordering column(s) are chosen by the system based on some heuristics), user provided explicit order, or the like. The file metadata information can be extracted from files, such as a data file or a micro-partition (e.g., a horizontal (grouped by rows) partition of data within a database, such as the cloud data platform). Additional example embodiments of the cloud data platform DataFrame API can provide for time series interpolation, time series resampling, correlation and covariance matrix, and dynamic pivot.

Additional examples provide for the running index to be used on database views. For materialized view, all the options are applicable but for non-materialized views sort on the cloud data platform database file format metadata columns to provide deterministic order may not be best and two options to provide deterministic ordering include materialized view with index into a temporary table and/or sort on all columns.

Additional example embodiments of the DataFrame workflow for execution at the cloud data platform can include importing a developer framework and programming environment DataFrame module, creating a DataFrame in the cloud data platform, performing operations on the DataFrame, saving the data to a cloud data platform table, and the like. Example embodiments of the present disclosure enable native DataFrame capabilities at scale in a cloud data platform with correct semantics (e.g., PANDAS-compatible semantics) and optimized performance. By enhancing the cloud data platform to include a transpiler, such as a Python-to-SQL transpiler, that allows users to use familiar semantics, such as Python DataFrame Library PANDAS, directly integrated with the cloud data platform. Examples include translating DataFrame APIs to equivalent or similar SQL statements to efficiently emulate DataFrame execution, users (e.g., data teams) can leverage Python analytics on terabyte-size and petabyte-size datasets. The innovations unlock new use cases combining data science workflows with enterprise data infrastructure. Dataframes is a library of the cloud data platform that provides DataFrame structures and DataFrame operations. Example embodiments include providing DataFrame semantics, DataFrame workflows, and the like by preserving row order, positional indexing, and data consistency for DataFrames.

In additional embodiments, the system for integrating programming capabilities into a cloud data warehouse platform includes a cloud data warehouse containing database tables storing large volumes of data, a developer framework that provides interfaces enabling querying, manipulating, and operating on the cloud data warehouse tables, and a programming environment where developers author scripts and applications using common programming languages that connect to the developer framework. Examples provide syntax extensions that add capabilities to the developer framework and programming environment, and an optional sandbox environment that provides a secure, isolated environment for running untrusted code scripts and applications. The developer writes code in the programming environment that connects to the developer framework to access the cloud data warehouse, executes queries, functions, and operations against the cloud data warehouse tables, and returns results back to the programming environment code.

Example embodiments of the present disclosure include a developer framework and programming environment of the cloud data platform that allows executing application logic directly within the cloud data platform or a component thereof. For example, the developer framework and programming environment represents a category of solutions that enable a programming framework and environment to be embedded directly inside a cloud data platform or warehouse. Using the cloud data platform's developer framework and programming environment runtimes and libraries, a user can securely deploy and process non-SQL code to build pipelines, machine-learning models, and applications in the cloud data platform. For example, the developer framework and programming environment can provide extension functions (e.g., UDFs, UDTFs, stored procedures, etc.), DataFrame(s), or the like.

The developer framework and programming environment library provides an intuitive API for processing, handling, and/or querying data in a data pipeline to enable developers to build applications that process data in the cloud data platform without moving data to the system where the developer's application code runs, and process data at scale as part of an elastic and serverless cloud data platform engine. Using the developer framework and programming environment, developers can automate data transformation and/or processing by writing stored procedures (e.g., extension functions) and scheduling those stored procedures as tasks in the cloud data platform.

Figure 6:
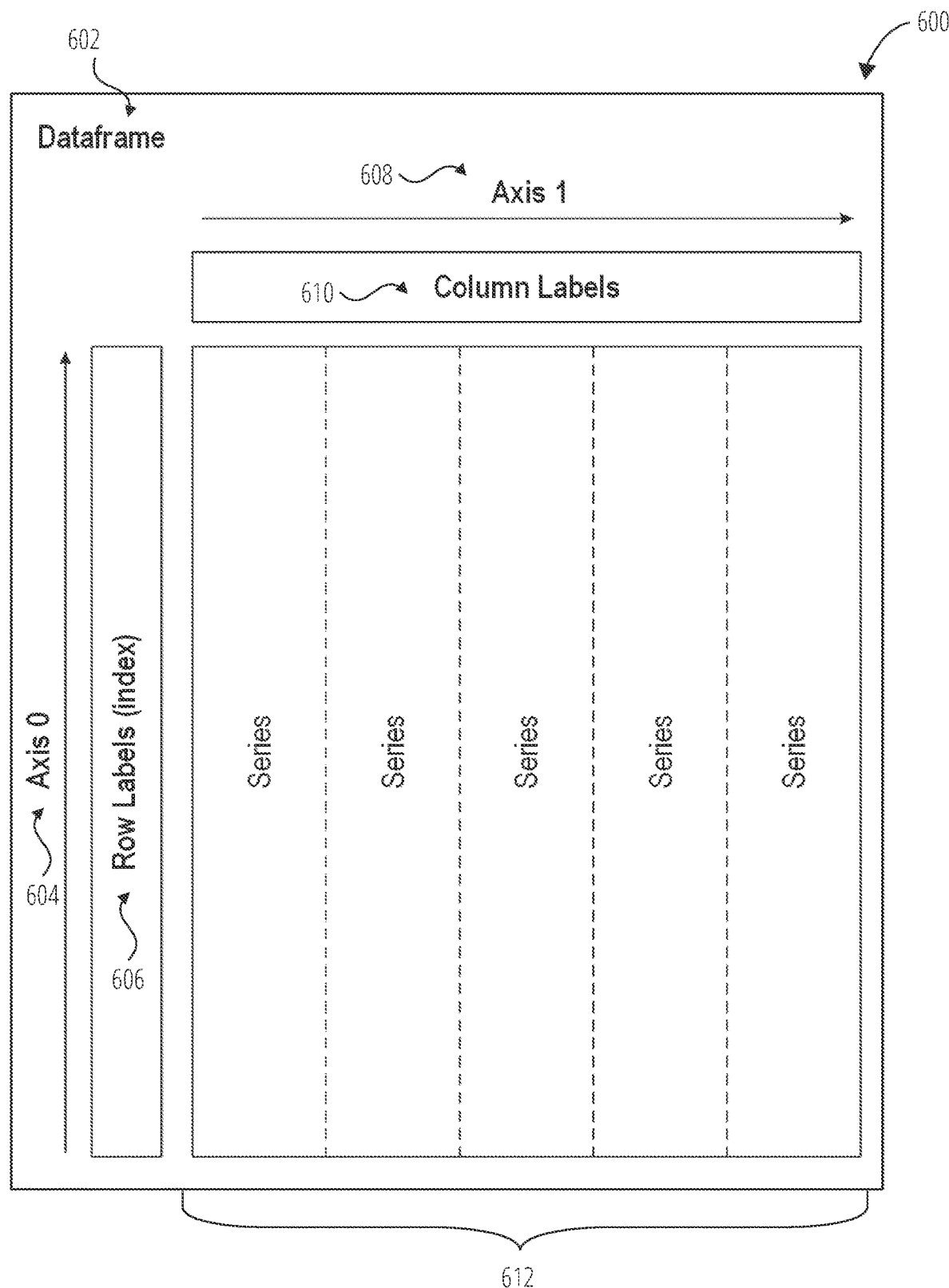
FIG. 6 is a block diagram illustrating an example of a DataFrame, according to some example embodiments.

FIG. 6 is a block diagram 600 illustrating an example of a DataFrame 602, according to some example embodiments.

A core abstraction in the developer framework and programming environment is the DataFrame 602, which represents a set of data and provides methods to operate on that data. DataFrames comprise a data structure employed in the realm of data analysis and data science disciplines, exhibiting prevalence in programming languages such as Python. A DataFrame constitutes an in-memory representation of tabular data defined by labeled rows (e.g., row labels (index) 606) and labeled columns (e.g., column labels 610) analogous to the formal relation model of a database table or spreadsheet format. Each column stores values of a singular data type, such as numeric, string, Boolean, or the like. The column maintains a label and the rows contain individual value instances. Rows delineate singular data records, as illustrated by the series 612, while columns characterize the attributes associated with each data record.

DataFrames support the storage, organization, and analysis of structured, tabular data, conferring an intuitive interface for interacting with two-dimensional datasets. Salient DataFrame operations and functionalities consist of indexing to facilitate retrieval of specific rows and columns referencing labels or integer-based positions, slicing to extract subsets of rows and columns analogous to ranges, addition and removal of columns and rows, sorting based on one or more columns, filtering to select subsets of rows satisfying conditional criteria, aggregations to summarize data using functions like sum, mean and count, joining to merge two DataFrame instances, pivoting to reshape data from row orientation to column orientation, grouping rows by values in designated columns, and the like. DataFrames constitute tabular data structures exhibiting prevalence in domains requiring programmatic data preparation, cleaning, analysis, and visualization.

A DataFrame can include two-dimensional, size-mutable, potentially heterogeneous tabular data, which is generally expressed as DataFrame ([data, index, columns, dtypes]), where DataFrame.columns is the column labels 610 of the DataFrame and DataFrame.index is the index (e.g., row labels 606) of the DataFrame. The index (e.g., row labels 606) of a DataFrame is a series of labels along a first axis, such as axis 0 604, that identify each row, where the labels can be integers, strings, or any other hashable type. The index (e.g., row labels 606) is used for label-based access and alignment and can be accessed or modified using an index attribute. Their salient benefit involves providing a user with an intuitive interface to interact with structured two-dimensional data in a procedural manner.

In the client code, a developer can construct a DataFrame object and set it up to retrieve the data that the developer wants to use (e.g., the columns containing the data, the filter to apply to rows, etc.). A DataFrame can represent a lazily evaluated relational dataset that contains a collection of row objects with columns defined by a schema (e.g., column name and type). Here, a DataFrame is considered "lazy" because it encapsulates the computation or query required to produce a relational dataset, where the computation is not performed until the developer calls a method that performs an action. For example, the data is not retrieved when the DataFrame object is constructed. Instead, when the user is ready to retrieve the data, the user can perform an action (e.g., transmit instructions to the cloud data platform to perform an order dependent DataFrame operation) that evaluates the DataFrame objects and sends the corresponding SQL statements to the cloud data platform database for execution. A core data structure utilized in the present system is a dataframe, which contains a dataset representing a logical relational view of structured data. Dataframes encapsulate a query defining the dataset view to be populated, which is evaluated lazily such that the query executes only when a specific action triggers data materialization. This deferred evaluation approach enables optimization and flexibility when transforming the dataset prior to retrieval. To operate on dataframe data, users first construct a dataframe object specifying the initial SQL query or data source, such as a database table or file, to populate the dataset. The desired transformations of the data are configured, including filtering rows, projecting specific columns, sorting, grouping aggregated views, and similar relational operations. Finally, an action method materializes the dataframe, executing the lazily defined query in its transformed state to populate the Dataframe with the result set. This approach allows data manipulation through a programmatic, intuitive domain specific API without needing to directly author SQL. Dataframes as implemented herein provide users a flexible relational interface for interacting with structured, tabular data at scale within the system's distributed query execution engine. The deferred retrieval paradigm facilitates applying multiple transformations prior to execution for efficiency.

Examples of the developer framework and programming environment provide ways in which a user can query and process data through a DataFrame. For example, to retrieve and manipulate data, the user can use a DataFrame class. To construct a DataFrame, the user specifies a source of the data for the dataset; for example, the user can create a DataFrame to hold data from a table, an external CSV file, from local data, the execution of a SQL statement, or the like. Then the user can specify how the dataset in the DataFrame should be transformed; for example, the user can specify which columns should be selected, how the rows should be filtered, how the results should be sorted and grouped, etc. Then the user can execute the statement to retrieve data into the DataFrame, in order to retrieve the data into the DataFrame, the user invokes a method that performs an action (e.g., the collect( ) method).

For example, a user can create a DataFrame using the cloud data platform 102 in a number of different ways, such as creating a DataFrame by reading a table in the cloud data platform, creating a DataFrame by reading files from a stage, creating a DataFrame by specifying a sequence or a range, creating a new DataFrame by applying transformations to other existing DataFrames, or the like. Broadly, operations on a DataFrame can be divided into two types: transformations and actions. Transforming a DataFrame can involve using a select( ) method, using the filter( ) method (e.g., similar to adding a WHERE clause), using a sort( ) method (e.g., similar to adding an ORDER BY clause), using agg( ) method, using the group_by( ) method (e.g., similar to adding a GROUP BY clause), handling missing values (e.g., NA functions), and the like.

Actions cause the DataFrame to be evaluated. When the user calls a method that performs an action, the developer framework sends the SQL query for the DataFrame to the server, such as the server environment 118. Performing actions on a DataFrame can include, for example, performing a query and returning an array of rows, performing a query and printing the results, performing a query and transforming it into a DataFrame asynchronously, and other methods such as performing a pivot (e.g., pivot_col, values) that rotates this DataFrame by turning the unique values from one column in the input expression into multiple columns and aggregating results where required on any remaining column values, where the parameters include pivot_col (e.g., the column or name of the column to use) and values (e.g., a list of values in the column).

Most operations in a DataFrame can be applied to both row-wise (axis=0) 604 or column-wise (axis=1) 608. Column-wise operations can be mapped naturally to operations over SQL columns. Example embodiments support row-wise operations in multiple ways. Row-wise operations can be supported by unrolling a row-wise operation into an expression (e.g., for df.sum(axis=1) generate a SQL expression x_1+ . . . +x_n with columns x_i). This places a burden on the SQL compiler 504 and may not be feasible for a large number of columns or complex operations like computing a quantile along axis=1. According to additional examples, row-wise operations can be supported by transposing the DataFrame, performing a column-wise operation, and transposing back. Additional examples can use a UDF to perform row-wise operations using original PANDAS operations.

Figure 7:
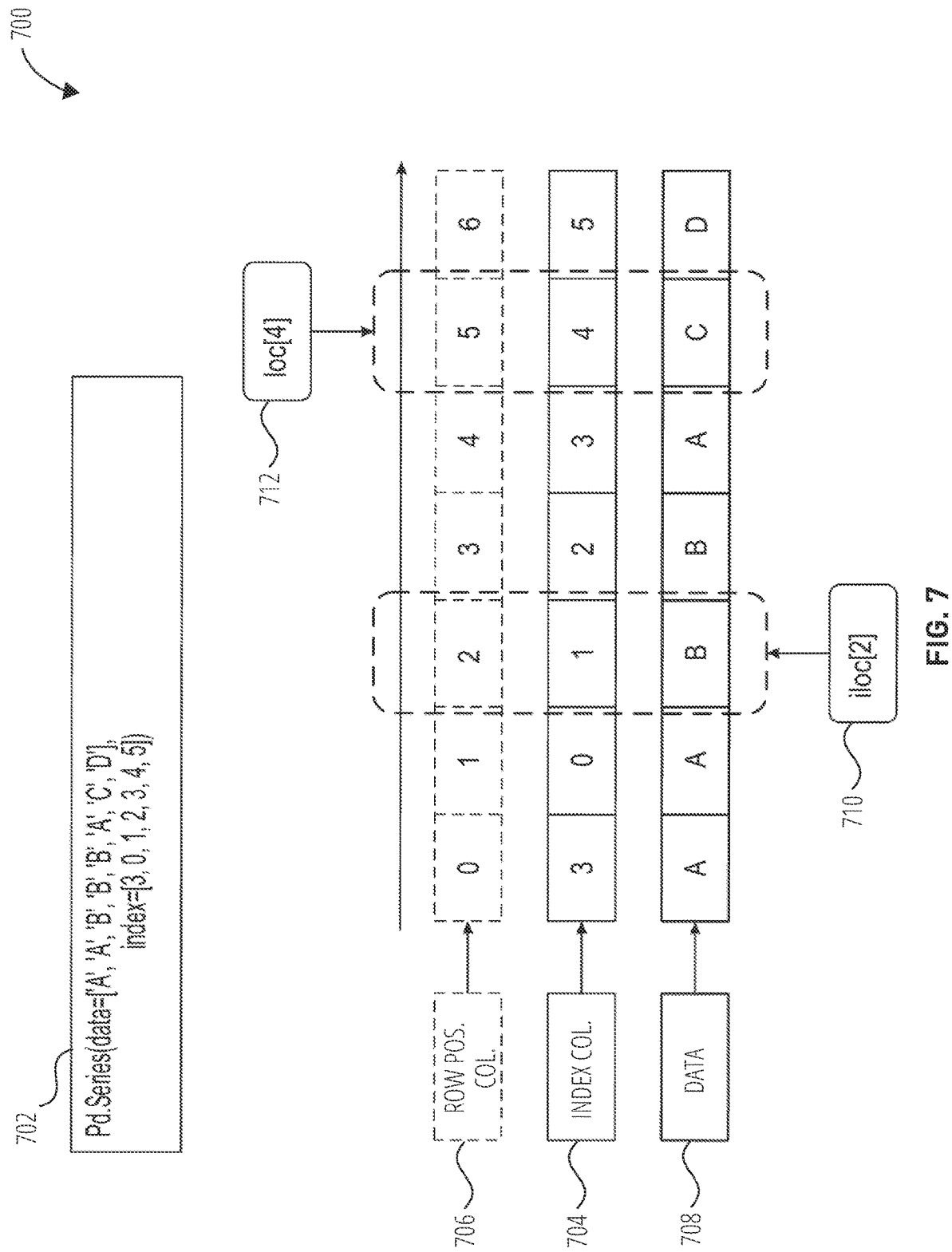
FIG. 7 is a block diagram illustrating an example of a SQL primitive running index, according to some example embodiments.

FIG. 7 is a block diagram 700 illustrating an example of a SQL primitive running index, such as a dedicated index column for DataFrames, according to some examples.

The block diagram 700 illustrates an example of how data can be accessed through row label and row position, separately. It is noted that the present disclosure identifies "row label" and "row position" differently from PANDAS semantics, which includes row labels as 'index' being different from 'row_position'). Throughout FIG. 7, the two concepts of "row position" (e.g., row position column 706) and "row label" (e.g., index 704) are used as follows.

Row position column (e.g., 706) includes a column that maintains the sequence of rows, used for accessing the first row via iloc[0], and the i-th row via iloc[i]. The row position column contains the absolute row number 0, . . . , n−1 with n=COUNT(*). Row labels (e.g., index 704) include similar semantics to PANDAS index, which forms row labels in the index 704. For example, the index 704 can be a column that the user specifies. If the user has not specified an index 704 column, the row position column 706, is automatically promoted to be the index 704 column. The index 704 column can access rows by label using an index location operation (e.g., loc[<index>]). Users can also use the index 704 column to perform a JOIN operation on two DataFrames. Indexes are typically propagated as columns across operations like FILTERS and JOINS. Index values are not necessarily unique across rows, for example, duplicates are possible. These values can be missing values (e.g., NULL, NaN, NA, etc.) as well.

Operations on the index 704 column can include, for exemplary purposes and not limitation, filtering (e.g., iloc, head, tail, _to_html_) or joining on the index column whenever there is an interaction between a DataFrame/series and DataFrame/series object. The index 704 column serves the primary purpose of keeping the order of rows intact. There are also operations like CONCAT that require adding a row position column 706 column to preserve the order of merged DataFrames. Because order of rows in DataFrames is an important semantic distinguishing DataFrames from SQL tables, adding a SQL primitive is beneficial and can simplify code generation.

Example embodiments include a primitive running index that repeatedly, for identical queries, generates a row position column order that makes data accessible via positional indexing (e.g., when subsequently running a query including a specified Nth row position). Any subsequently run query during any session will always return the Nth row, and the row returned will be the same row when running the same query repeatedly, without the need for query caching, as long as the underlying data does not change. Using the primitive running index according to examples, any positional DataFrame APIs can be implemented using a repeatable, deterministic row position to guarantee DataFrame semantics over an SQL warehouse and allows for efficient (e.g., cost effective) DataFrame analytics on SQL warehouses.

With the introduction of a positional indexing primitive, DataFrame workloads over a SQL warehouse are enabled and semantics are guaranteed to be the same as if the workload was processed on a single client machine. Such positional indexing solutions provide for deterministic results (e.g., reliable, repeatable row number generation)

that are repeatable across queries and sessions, with no additional cost to users of the cloud data platform, because there is no need for the expensive creation of a temporary table or requirement to maintain the temporary table during a session. Examples further provide advantages over existing technologies by enabling implementation using the same or similar semantics of positional APIs in DataFrame libraries, already known to data scientists and users. Such position indexing enables efficient distributed processing of row-order dependent workloads in a developer framework and programming environment of the cloud data platform.

According to examples, whenever input without a designated index column is read, an index corresponding to a column running from 0 . . . n−1 needs to be generated for n rows. Analogously, for any series object a running index is also generated. Adding a generated index is done whenever reading from a base table for which user does not explicitly specify one or more columns to form an index and for any series-like object (e.g., NumPy vectors, lists, PANDAS.Series, PANDAS.DataFrame, etc.) that needs to be uploaded to a backend server, such as the server environment 118 or other component of the cloud data platform 102. Generating the index column on the server backend is helpful to ensure usability and performance, for example.

In one example embodiment of the cloud data platform SQL system, a running index using the following recursive SQL statement can be created, for example: SELECT (ROW_NUMBER( ) OVER (ORDER BY SEQ8( ) ASC)−1) AS <index name>, * FROM (<query>). In another example, a constant expression in ORDER BY clause for better performance SELECT (ROW_NUMBER( ) OVER (ORDER BY 1 ASC)−1) AS <index name>, * FROM (<query>) can be implemented.

In some examples, when translating DataFrame operations to SQL, many row position columns need to be generated (e.g., nearly every DataFrame operation needs to be order preserving, thus requiring a recursion and row number generation). Executing SEQ8( ) together with the windowing and a recursive query is slow and hard to optimize. In order to overcome these difficulties, according to some example embodiments, a new SQL primitive RUNNING_INDEX(<offset>) can be added that allows the cloud data platform to add at minimal computational cost a running index column. <offset> should be the start offset of the index column. For example, SELECT RUNNING_INDEX (0) As <index name>, * FROM (<query>). In additional examples, repeated generation is not always needed.

In some examples, because indices and order are so important for DataFrames, this primitive can be leveraged for future optimizations in an SQL optimizer, such as the SQL engine 142. By analyzing accesses to the index column, scans can be pruned and generated SQL code can be simplified. For example, one optimization that can be achieved with a running_index primitive includes joining on two columns generated both by running_index. For example, when joining two columns, overlapping segments can be efficiently determined. Per default data, data has an order (e.g., indicated by running index). This means, the sort-stage of a sort-merge-join operation can be skipped. For example, the JOIN operation may only require computing overlapping segments and performing the merge-step. Furthermore, when joining on a running_index column with identical range, the JOIN operation can be performed as a simple column concatenation.

Additional example frameworks according to the present disclosure can be benefited using the same SQL primitive. Operations involving filtering on DataFrames using other DataFrame/series objects are similar to the second integer location (e.g., iloc) example, as they can involve uploading and joining on indices if it is not an auto-join operation. For example, the second integer location (e.g., iloc) can include a lookup based on integer location (e.g., iloc[0]) that gets the first row no matter what the current index is; for example, integer location 2 (e.g., iloc[2] 710). In additional examples, a location based on label lookup (e.g., loc) can be performed if the index is comprised of integers; for example, loc[0] gets the first row for which the index has value 0, and label location 4 (e.g., loc[4] 712). In additional examples, joining a first database with a second database can prioritize a first database over the second database. In some examples, joining a first database and a second database can prioritize the second database over the first database (e.g., right JOIN operation).

In some examples, when a table is read (e.g., mapped, reviewed, etc.), a first case includes a user specified index column and a second case includes no user specified index columns while the default row position column metadata column is used. In additional examples, when mapping an existing table, three cases are considered. In the first case, the table already has a column that can be used as an index column (e.g., integer type, starting from 0, no gaps, no nulls). In a second case, the table has a primary key column. In a third case, the table has none of those (e.g., no index column and no primary key column). If the index column is not specified by the user, then the table metadata is queried to see if the primary key is available. If a primary key is present, then when generating a query, index values are computed using the primary key, for example: ROW_NUMBER( ) OVER(ORDER BY pkey_column). Example embodiments include the primary key being unique.

In additional examples, the cloud data platform or component thereof can allow (e.g., enable) a user to manually specify the primary key column when creating a DataFrame, for example: df=cdp_table(generate_index_from= "pk_col"). This example enables the user to specify any column that has unique values and no nulls as being identified as the primary key. For example, if no index column exists and no primary key is identified, the system can use columns with unique constraints for ordering. If there are multiple columns with unique constraints, the system can deterministically select one column (e.g., sort columns by name and select the first column). In further examples, if an order is not unique, for tables without an index column, without a primary key, and without a unique column, the system can order by a set of columns, such that the group of columns can uniquely identify a row in the table. If an index column and/or a primary key column is not found and the user attempts to perform an operation that needs index values, then at query generation time, the query is failed with an error message telling the user that the API needs either an explicit index column or a primary key column (e.g., via generate_index_from). For example, when loading data into a table from a DataFrame, the user is allowed to specify that the index column needs to be written as well. For example, df=read_csv('file.csv'); df.write_to_cdp_table (write_index_column_as='idx_col'). This approach makes index column specification explicit when accessing tables and the cloud data platform 102 provides users clear semantics on how they are handled by the system according to example embodiments. According to examples, a SQL syntax extension can be generated, for example: CREATE [OR REPLACE] [TEMPORARY|TRANSIENT] [READ ONLY] TABLE <table_name> CLONE <source_table>.

As noted above, the second problem addressed by example embodiments is deterministic row position. According to example embodiments of row position, such as the row position column 706, in a developer framework and programming environment DataFrame, the DataFrame operations are evaluated lazily. This provides the flexibility to not order any intermediate results (as intermediate results are generally not presented to the user) and only require ordering the final output, if needed (e.g., when displayed to the user, written to file, etc.). For example, with the following operations on a DataFrame, only the final output (e.g., result) needs to be ordered before display, but internal results of intermediate results, such as query(filter) or add operations, can be unordered.

In some examples, when generating a SQL query from a DataFrame operation, keeping track of which columns to order the output on (e.g., for a JOIN between two DataFrames, the output has to be ordered on the ordering columns of the left followed by the ordering columns on the right (e.g., left, right)). This is explicitly tracked by tracking the ordering expressions only for the final output, to avoid generating any unnecessary ORDER BY clauses within a subquery.

Examples of operations that require an ORDER BY clause or computing a row position column 706 (e.g., row position) of the DataFrame can include, for example: A DataFrame is displayed to user, results are written to a file (e.g., to_csv, to_json, etc.), API operations including head, tail, and/or merge, API operations for row position column 706 generation, and order dependent aggregate functions (e.g., array_agg, etc.). A DataFrame can have multiple actions performed on it, resulting in multiple SQL queries being issued. In some examples, HEAD and TAIL operations illustrate how the ordering expression is maintained during the DataFrame operations, and the row position column 706 expression that is used to generate the gap free row position for the result, if needed.

In other examples, a deterministic gap free row position generation for read-only data snapshot can include the gap free row position beginning from 0 to n−1 for all rows in the table (e.g., database). This row position generation depends on the underlying cloud data platform database file format file layout and can be deterministic as long as the underlying file layout does not change. To provide the data consistency guarantee, a read-only snapshot is created at DataFrame creation (e.g., using read_platform( )). During the lifetime of the DataFrame, all operations will be performed on the snapshot, instead of the original object, which mimics the read-into-memory behavior. To provide the row position semantics, the semantics begin with the gap free row position of the data snapshot and simulate the logical order of DataFrame by keeping track of the ordering expressions on the client-side across various DataFrame operations. The ordering expression is used to determine the result order, and used for generating the ORDER BY clause when ordering is required; for example, ordering is required when the result is computed (e.g., for display). Some DataFrame operations require re-generating gap free row position, such as iloc, iat, and merge. The gap free row position can be generated using row_number( ) over (order by <ordering expression>).

Additional example embodiments provide the consistency and deterministic row position assignment to create a temporary table (e.g., ResultSet) along with an explicit index column using the existing row number generation method (e.g., row_number( )). For example, the query run when read_platform is called, where a row_position column is explicitly created, for example: pd.read_platform ("mytable") #Generated SQL CREATE TEMPORARY TABLE mytable_<unique_suffix> AS (SELECT row_number( ) over (order by 1)−1 as row_position, * from mytable). The advantage of this approach is that it is simple, straightforward, and works for all cloud data platform objects (e.g., views, tables, etc.). Furthermore, there is no extra server-side work needed.

According to some examples, to achieve PANDAS-compatible and/or PANDAS-like row position semantics and data consistency semantics in the developer framework and programming environment DataFrames, a read-only snapshot can be used. For example, a read-only data snapshot for a cloud data platform object can include the read-only data snapshot being logically immutable, where no or few DML or DDL operations are allowed (e.g., DROP).

Figure 8:
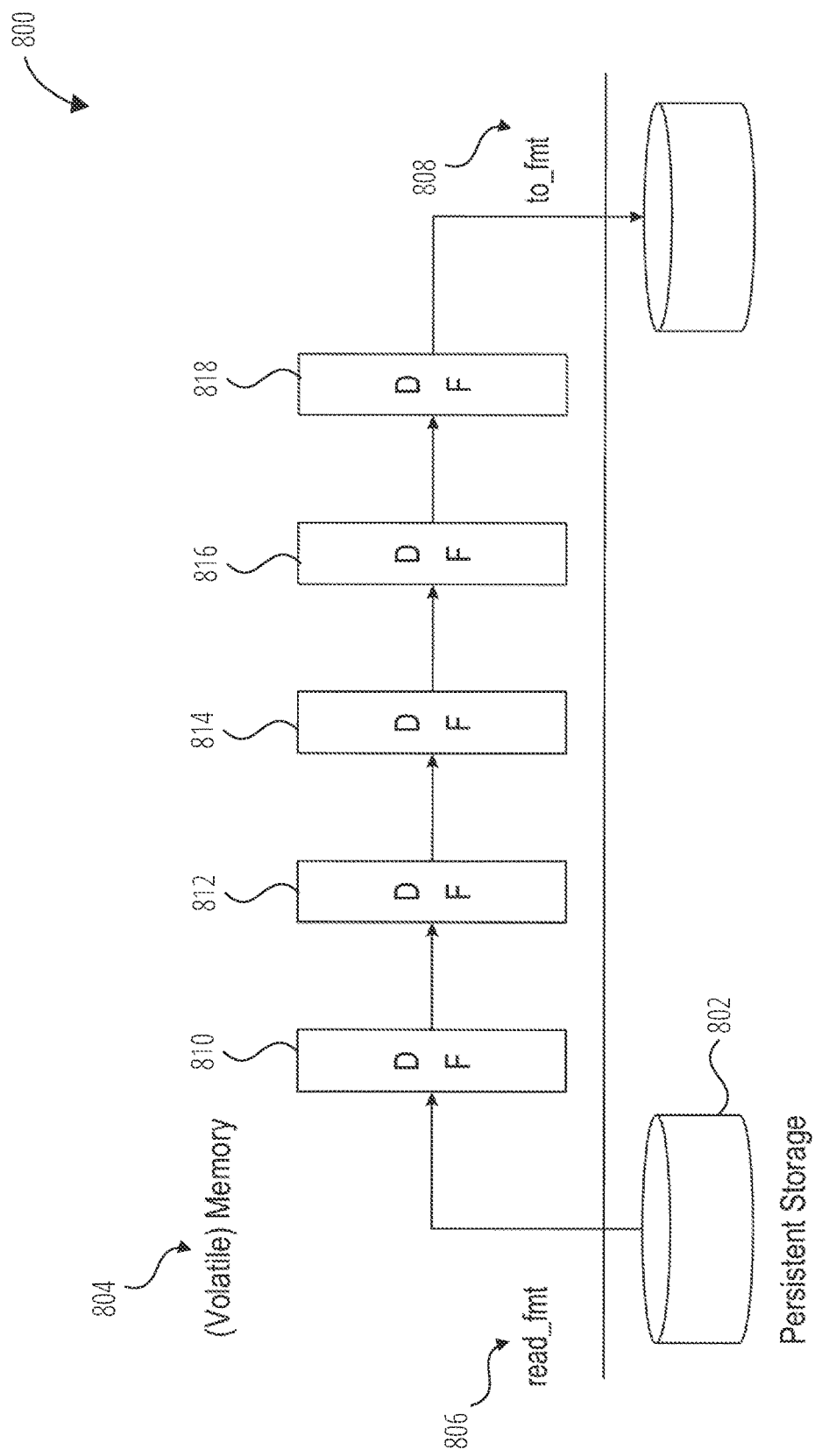
FIG. 8 is a block diagram illustrating an example of a data snapshot and row position assignment, according to some example embodiments.

FIG. 8 is a block diagram 800 that illustrates an example of a data snapshot and row position assignment, according to some example embodiments.

The cloud data platform DataFrame snapshot provides a cheap mechanism to obtain this snapshot on base tables, views, and all cloud data platform data objects. It is necessary to keep track of one or more columns to order the rows of a DataFrame when an action is performed. Additional example embodiments of the present disclosure overcome the technological difficulties by providing a developer framework and programming environment on the cloud data platform, such that when a DataFrame is created, all of the following operations on the DataFrame will be performed against the same snapshot of data. Where the read only snapshot of data preserves the underlying storage file layout throughout the lifetime of the snapshot, enabling deterministic row position assignment in the future. In examples, logical data objects like DataFrames, metadata files, database file format files, micro-partition files, and the like, rely on one or more foundational data files and sources, referred to herein as "underlying data files." For example, a DataFrame may be populated by loading data from structured sources, such as database tables or semi-structured files in a database system (e.g., distributed file systems, cloud data platform, etc.). These originating structured data files persist the raw data values in their native storage formats, forming the basis or foundation that supports populating derived logical data objects. As such, the term "underlying data files" refers to the originating data sources consumed to populate and provide the data represented in dataframe and other logical data objects. Deterministically processing dataframes requires analyzing and preserving the ordering of records and values within these underlying data files that ultimately supply the DataFrame's data. By generating an ordered, gapless row index based on analyzing underlying file metadata, example methods disclosed herein facilitate correct, repeatable row ordering and positional-based access semantics when manipulating dataframes built on distributed data systems.

Accordingly, a read only data snapshot for an object of the cloud data platform is generated as a logically immutable table where no data manipulation language (DML) or data definition language (DDL) operations or statements are allowed. To provide the necessary data consistency guarantee, a read only data snapshot is created during the initialization of the developer framework and programming environment DataFrame, such as DataFrames 810/812/814/816/818. During the lifetime of this DataFrame, all operations are performed on this snapshot instead of the original object (e.g., table, view, etc.). The read only snapshot is no longer impacted by changes to the original object and therefore behaves as if the data is loaded "in memory," such as volatile memory 804 to match semantics of prior existing DataFrame technologies (e.g., PANDAS).

In some examples, the cloud data platform tables use zero-copy clone capabilities to make a data snapshot in an efficient way, where it makes a copy of the metadata including the file metadata, but the actual data is not copied or replicated, thus making these operations inexpensive for both the user and the cloud data platform. The cloud data platform can further disallow or block any DML operations in order to make the snapshot logically immutable. The cloud data platform can disallow DDL statements that change the schema or structure of a table to prevent both data changes and structural changes to the database table. Other background jobs (e.g., defragmentation, file compaction, auto-clustering, etc.) can further be disallowed in order to halt any potential change to underlying storage file structure of the snapshot, thereby enabling deterministic row position assignment features. This technique is useful in scenarios where an application requires a consistent snapshot of data, without concurrent changes affecting results, like analytics, reporting, or caching. The snapshot provides data consistency and deterministic behavior by preventing concurrent modifications.

As noted above, two existing concerns are determinism and consistency. Determinism refers to the same output being produced for the same setting. Intuitively, if there are no changes a user would expect the same behavior. This also means that if two results are different the user can deduce that something has changed. Same setting in this context means within the same session, for the same user and for the same data and at the same time. For example, no data manipulation operations were performed by any users against the underlying data. Note that internal operations like data reorganization (auto-clustering) may happen at any time. Some examples apply weakly-deterministic (duplicates), where determinism itself is an extraordinarily strong guarantee in that even for duplicates; for example, duplicates for two rows a,b where the values for each column i are identical. In other words, ($a\_i = b\_i$), such that the output order must be stable. In the DataFrame context, weakly-deterministic duplicates can weaken that guarantee where the order does not need to be stable for duplicates. This is similar to the difference between the output of a stable (e.g., radix-sort) and unstable (e.g., quick-sort) sorting algorithm. Consistency refers to client-side consistency. For example, any DataFrame operations carried out (e.g., on top of the same DataFrame) by a user should have the same semantics as if they were carried out purely on the client with a local DataFrame library.

According to some examples, creating a read-only data snapshot can include a base table. For the base table, the cloud data platform provides a zero-copy clone capability to make a data snapshot in a cheap way, where it makes a copy of the metadata including the file metadata. However, the clone is not immutable, which means the underlying file layout can change due to various operations, including DML operations and/or DDL operations that either change the data or underlying file structure. In additional examples, there are exception operations that do not change data or underlying file structure, these operations are allowed. For example, DESCRIBE, SHOW, DROP, UNDROP, COMMENT, ALTER TABLE, RENAME TO, ALTER TABLE, and the like.

Additional examples can use expression property file compaction. Expression properties include a summary of column properties in a cloud data platform database file format file (e.g., a micropartition). The expression properties can include, for example, minimum values in each column, maximum values in each column, flags indicating the presence of NULL values in each column, or the like. Other examples include operations such as defragmentation, auto-clustering, table rebuilding, EP file re-clustering, DML Patch (e.g., to allow system patch/metadata upgrades).

To provide the read-only data snapshot of the base table that can support deterministic generation of row positions, examples can be built on top of the clone technique and disable all above operations that could change the file layout for the cloned table. In some examples, data and metadata corruption for read-only tables must be considered. Since the read-only table is just an extra property on top of the existing table, and there is no extra data or metadata handle added, all existing data corruption prevention and detection mechanisms for tables can still be applied. Multiple tools can be implemented to recover data and metadata and incorporated into the cloud data platform, such as rebuild services, micro-partition file blocklisting and patching, time travel with re-insert, and the like. For tables with row access policy applied, users may not get access to all rows, but the clone today does not clone the policy. For such tables it will materialize the filtered rows into a new table and use this new table to create a read-only data snapshot.

In additional examples, other than external tables, the cloud data platform also provide capability to create a table out of the staged files with different format (e.g., CSV, JSON, AVRO, ORC, PARQUET, XML) with COPY INTO, or directly query the data in staged files to create a view. For the formal case, since it already materialized a table, it will basically be treated the same as base table, where a read-only cloned table will be created to perform operations on. For the latter case, it will be treated the same as view, where it will materialize it with a temporary table.

In the cloud data platform DataFrame, the DataFrame operations are evaluated lazily, giving the flexibility to not order any intermediate results (as they are never presented to the user), the only need for ordering is to order the final output, if needed (e.g., when displayed to the user on a user interface, written to file, etc.). To provide the final ordering guarantee, a deterministic gap free row position is assigned to the data snapshot on creation, and the client-side will simulate the logical order by maintaining track of two expressions on the client-side across various DataFrame operations. For example, the two expressions tracked are order expression and row position expression.

According to examples, the order expression is used in the ORDER BY clause when ordering is required, which is generally needed when the result is materialized (e.g., for display). The row position expression is used for generating a gap free row position for the current result, which is generally needed for some operations that deal with row indexing and joining of DataFrames, such as PANDAS-compatible operations including integer location (iloc), integer at (iat), merge, etc.

In some examples, row position generation for a data snapshot is provided and calculated according to a metadata column computed based on a file offset. In computer file systems, a file offset is a numeric value that represents the distance (e.g., in units) from the beginning of a file at which some specific data begins. File offsets allow data to be accessed randomly from anywhere within a file without having to read the entire file sequentially from the beginning. File offsets represent positions of data within a file and are specified in units like bytes (or sometimes other units like blocks). File offsets allow random access to data instead of just sequential access from the start of the file. The first byte in a file has a file offset of 0. By keeping track of file offsets, computer programs can easily locate and retrieve data from files. For example, if there was a file with 1,000 bytes of data, and it was desired to access the 100th byte in the file, a file offset of 99 could be specified (since the first byte has offset 0). The computer program reading the file could then jump right to that position, the 99th byte, and read the data without traversing all the preceding bytes. A file offset is like an address that specifies the exact location of some data within a file.

A metadata column ROW_POSITION that can be queried with a table. The ROW_NUMBER metadata column has DataType SqlSb8Number and provides the following properties: 1) A gap-free row number starts from 0 to N−1 for rows in the table. 2) Deterministic for read-only tables. 3) No deterministic guarantee for non-read-only tables. 4) Only available for regular tables, not for external tables, hybrid tables, and iceberg tables. The metadata column can be queried with a table using the following syntax: select metadata$row_position as row_position from <table>.

The ROW_NUMBER is calculated based on the file offset with an implicit file order provided by the expression property, and the offset is calculated with a simple rule as follows: The first file starts with offset 0. Offset of a file after the first file is calculated as the offset of the previous file plus the row count of the previous file: offset[fn]=offset[fn−1]+ row_count[fn−1]. Table 1 gives a simple illustration about the offsets for a table with three cloud data platform database file format files in order: file_a with 100 rows, file_b with 50 rows, and file_c with 50 rows.

TABLE 1

| OFFSET | 0 | 0 + 100 = 100 | 100 + 50 = 150 |
|---|---|---|---|
| | FILE_A | FILE_B | FILE_C |
| row count | 100 | 50 | 50 |

As long as the underlying file structure does not change, the offset is always guaranteed to be the same for each file, which is the case for read-only data snapshot. This offset will be passed to the execution platform 110 along with a scan set and used for the row number metadata column calculation.

According to additional examples, fix existing row_number( ) order by 1 to provide row number calculated based on file offset. The most straightforward way to generate a deterministic row number is to call the following row_number( ) over (order by metadata$partition_name, metadata$partition_row_number)−1. Where the metadata columns PARTITION_NAME and PARTITION_ROW_NUMBER correspond to the micro-partition file name and row number within the micro-partition file for regular cloud data platform tables separately. Another way was to use row_number( ) over order by 1, which avoids sorting after all columns, but the result would be not deterministic.

According to other examples, the row_number( ) is changed over order by 1 on the base table to provide row number generation based on the file offset. Similar to the previous example, the offset of each file can be calculated and used for calculating the row position. However, unlike metadata columns, compilers are free to move the SQL functions around and apply optimizations like file pruning, filter push down, etc. In order to guarantee the determinant during different evaluations when there is no change made to the file structure, the existing pseudo/metadata columns PARTITION_NAME and PARTITION_ROW_NUMBER are utilized. Examples can sort on file metadata information during table scanning along with normal columns, the system populates some pseudo/metadata columns as described herein. A combination of FILE_ID and ROW_POS uniquely identify a row in a table. The system can leverage these columns to provide deterministic ordering, for example: //FILE_ID—string file ID (unique within the volume)//ROW_POS—integer row position in the file (unique & ascending within the file). The running index on the base table includes a primitive that can be built on top of the ROW_NUMBER window function being roughly equivalent to the following expression: ROW_NUMBER( ) OVER (ORDER BY <ordering_columns>)−1.

Based on the offset calculated, a new metadata column PARTITION_OFFSET will be projected with the value of file offset, and the row number will be calculated as (PARTITION_OFFSET+PARTITION_ROW_NUMBER). The same guarantee as the new metadata column is provided for the row_number( ) order by 1 on the base table. In some examples, the metadata column values can change even without any DML operations on the table by auto-clustering jobs or the like. Example embodiments track auto-clustering jobs that can change the metadata column values by employing (e.g., enabling) tracking on the table to track a partition name and a partition row number of a row when it was first ingested, such that the metadata information is otherwise available for confirmation, tracking, and monitoring.

In additional examples, a new SQL function can be calculated based on a file offset. Example embodiments further include computing the file global offset. In some examples, it can be computed on the fly based on the implicit order maintained by the expression properties (EP) file. According to this example, the file offset is calculated based on the file collection for a table version, and whatever order maintained by the EP file will be used as the order for calculating the offset. In other words, the order will change if any operation that can change the EP file ordering is applied, since all those operations are disabled for read-only tables, the order is fixed for read-only tables once created. Once the offset is calculated, it will be cached in the MetaCache along with the FileCollection of table version, and a recalculation is required once the cache is invalidated. The offset calculation will only be triggered if the TableScan operator involves the row position metadata columns. In other examples, it is computed on the fly with an explicit order with sorting, where the file offset will be calculated based on the file collection of a table version. However, instead of using whatever order that is provided, a sorting will be applied explicitly to enforce the order (lexicographically ordered by file name).

In additional examples, the offset is calculated and persists during the read-only table creation, where the offset will be calculated in the final stage of read-only table creation (e.g., after EP file compaction is done), and persisted as twoLevelEPfile information or in a key-value store, such as a global metadata query engine. During the cached file collection initiation for a table version, this information will simply be recovered from the persist layer instead of doing a recalculation.

According to additional examples, read-only semantics can also be provided to schema and database objects. Same as table, read-only schema and database will not allow any modification to existing objects as well as will not allow adding new objects (e.g., tables, views, schemas etc.). Additional DataFrame features and capabilities can be supported by maintaining a metadata object inside a cloud data platform DataFrame on the client side. For example, the duplicated and case sensitive column name problems are addressed by maintaining extra metadata field df_column_name, where the actual name for the column for the DataFrame is case sensitive and also allows duplication. For operations that are performed on the DataFrame, the df_column_name is used, and a cloud data platform column identifier will be used when accessing through cloud data platform SQL. A mapping between the df_column_name and cloud data platform column identifier will be maintained by the metadata object at client side. Similarly, most PANDAS specific data types can be resolved by maintaining extra data type property in the metadata.

Figure 9:
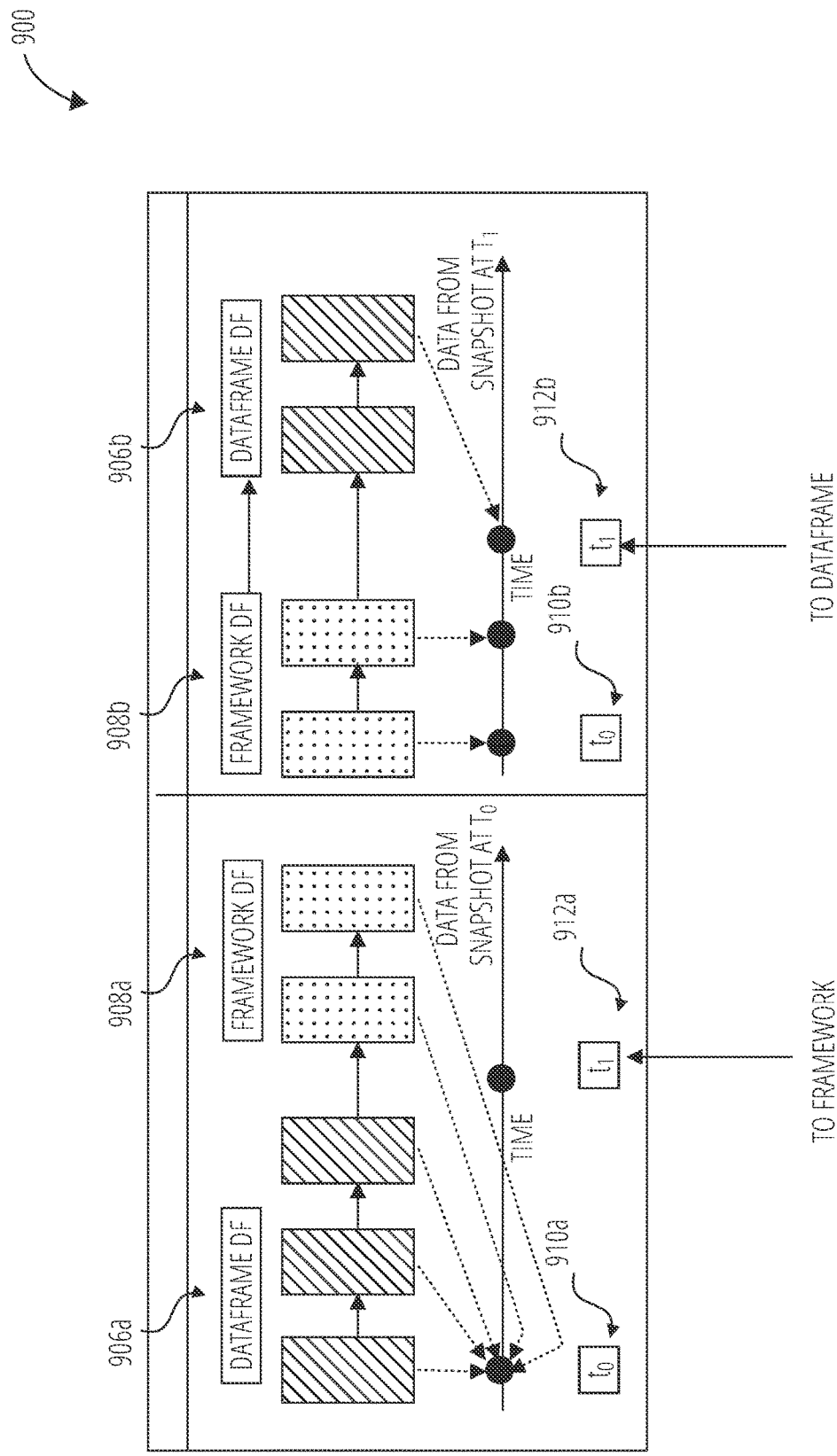
FIG. 9 is a block diagram illustrating the use of data snapshots, according to some example embodiments.

FIG. 9 is a block diagram 900 illustrating the use of data snapshots according to example embodiments.

On the left side of the block diagram 900, a DataFrame data frame 906a is created at time to 910a and operates on a snapshot of data at time to 910a. Once converted to the developer framework and programming environment 528 as described and depicted in connection with FIG. 5, the system continues to operate on the data snapshot at time 910a.

On the right side of the block diagram 900, a framework data frame 908b operates on the original data, and the original data is converted back to DataFrame at time ti 912b, and the DataFrame data frame operates on the data snapshot created at time ti 912b.

In some examples, syntax extensions that can be used to expose the read-only data snapshot are considered to add new table qualifier, add new table property, add a new object, or the like. The example embodiment of block diagram 900 shows when a DataFrame is created, all following operations on the DataFrame will be performed against the same snapshot of data. The following data consistency example code gives a simple example about data consistency, where two sum operations on the same DataFrame yield the same result, but different results can be obtained on the sum operations on different DataFrames even with the same underlying table.

mytable: col1 [1, 3]
import cdp.framework.modin.pandas as pd
df=pd.read_cdp("mytable") #take a snapshot of data
df.sum( ) #output1=4
<'mytable' is updated in backend by another user/transaction>
mytable: col1 [1, 4]
df.sum( ) #output2=4 (same as output 1)
df=pd.read_cdp("mytable")
df.sum ( ) #output3=5 (reflects change made to table)

According to the example code and comments, output 1 should be the same as output 2, but output 3 will reflect the changes made to the table. This example code is different from the developer framework and programming environment DataFrame example where an operation will always be evaluated on the most recent data, and repeated runs of the same operation may have different results if the underlying data has changed.

Figure 10:
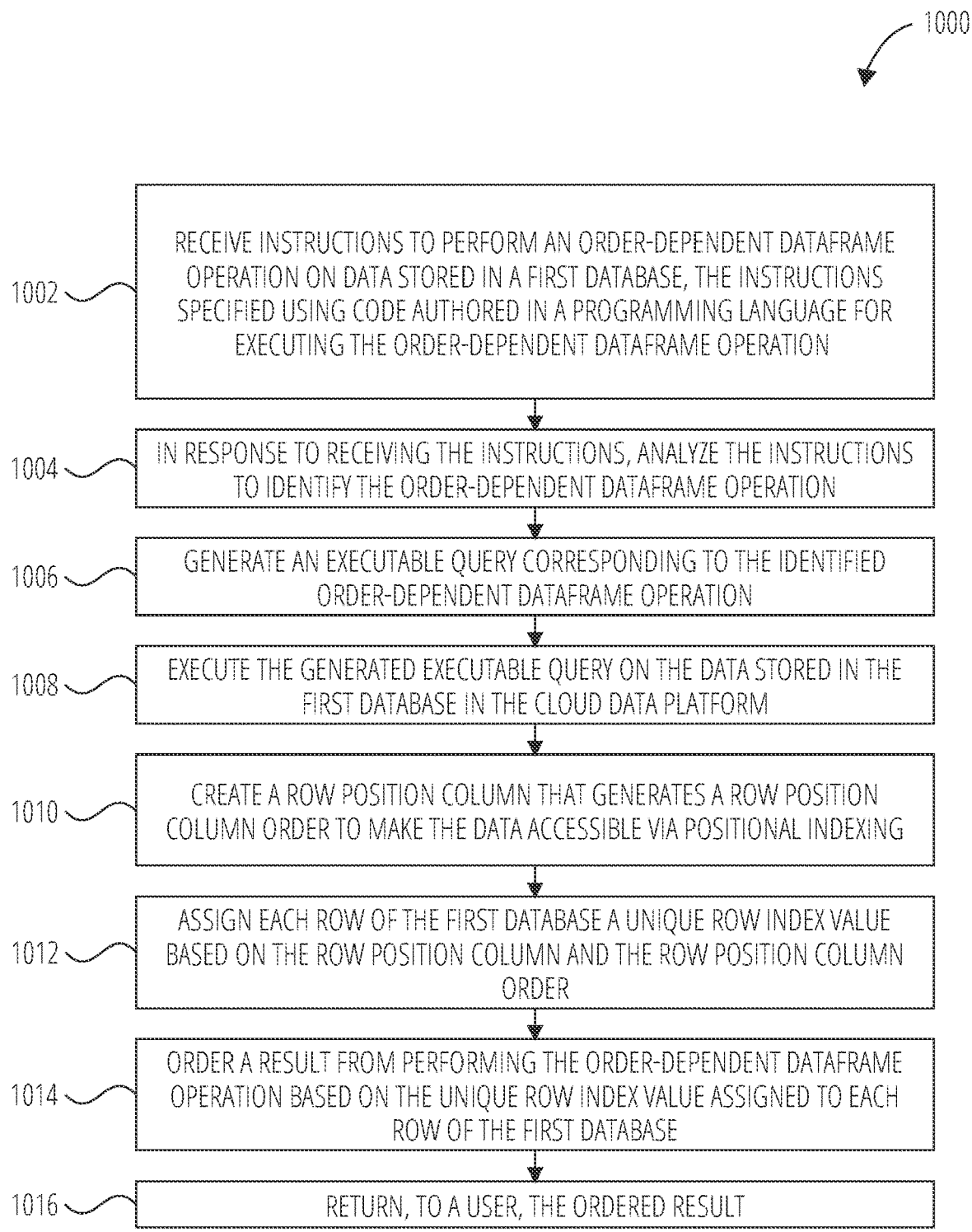
FIG. 10 illustrates an example flow diagram of a method for employing a primitive running index to make data accessible via positional indexing according to row position, according to some example embodiments.

FIG. 10 illustrates an example flow diagram of a method 1000 for employing a primitive running index to make data accessible via positional indexing according to row position, in accordance with one embodiment.

According to the present disclosure, example embodiments disclose methods of using a primitive running index by employing the SQL engine 142, the server environment 118, the client environment 116, and/or the developer framework 140. For example, the method 1000 can be embodied in machine-readable instructions or machine storage medium for execution by one or more hardware components such that the operations of the method 1000 can be performed by components of the cloud data platform 102, the client environment 116, or other components operably interconnected thereto. Accordingly, the method 1000 is described below, by way of example with reference to components of the cloud data platform 102. However, it shall be appreciated that method 1000 can be deployed on various other hardware configurations and is not intended to be limited to deployment within the cloud data platform 102. Depending on the embodiment, an operation of the method 1000 can be repeated in different ways or involve intervening operations not shown. Though the operations of the method 1000 can be depicted and described in a certain order, the order in which the operations are performed may vary among embodiments, including performing certain operations in parallel or performing sets of operations in separate processes. While the various operations in the method 1000 are presented and described sequentially, one of ordinary skill will appreciate that some or all of the operations may be executed in a different order, be combined or omitted, or be executed in parallel.

In block 1002, the SQL engine 142 receives instructions to perform an order-dependent DataFrame operation on data stored in a first database in a cloud data platform, the instructions specified using code authored in a programming language for executing the order-dependent DataFrame operation within the cloud data platform In block 1004, the SQL engine 142 analyzes the instructions to identify the order dependent DataFrame operation in response to receiving the instructions. In block 1006, the SQL engine 142 generates an executable query corresponding to the identified order dependent DataFrame operation. In block 1008, the SQL engine 142 executes the generated executable query on the data stored in the first database in the cloud data platform. In block 1010, the SQL engine 142 creates a primitive running index that generates a row position column order to make the data accessible via positional indexing. In block 1012, the SQL engine 142 assigns each row of the first database a unique row index value based on the primitive running index and the row position column order. In block 1014, the SQL engine 142 orders a result from performing the order dependent DataFrame operation based on the unique row index value assigned to each row of the first database. In block 1016, the SQL engine 142 returns, to a user, the ordered result.

In some examples, where the instructions to perform an order-dependent DataFrame operation on data stored in a first database in a cloud data platform, the instructions generate a deterministic, gap-free, strictly monotonically increasing sequence of integers for a distributed system, which allows to efficiently perform order-dependent DataFrame operations on data stored in a database in a cloud data platform. In some examples, a table, hybrid table, external table, or other object can be used in place of or in addition to a database. In some examples of generating a row position column order, examples allow tracking individual rows' position with minimal overhead. In some examples, the row position column and the row position column order can be backed by a pseudo-column. In some examples, performing an aggregation operation on the first database can include performing for group aggregation, pure aggregation, or other aggregation types.

Figure 11:
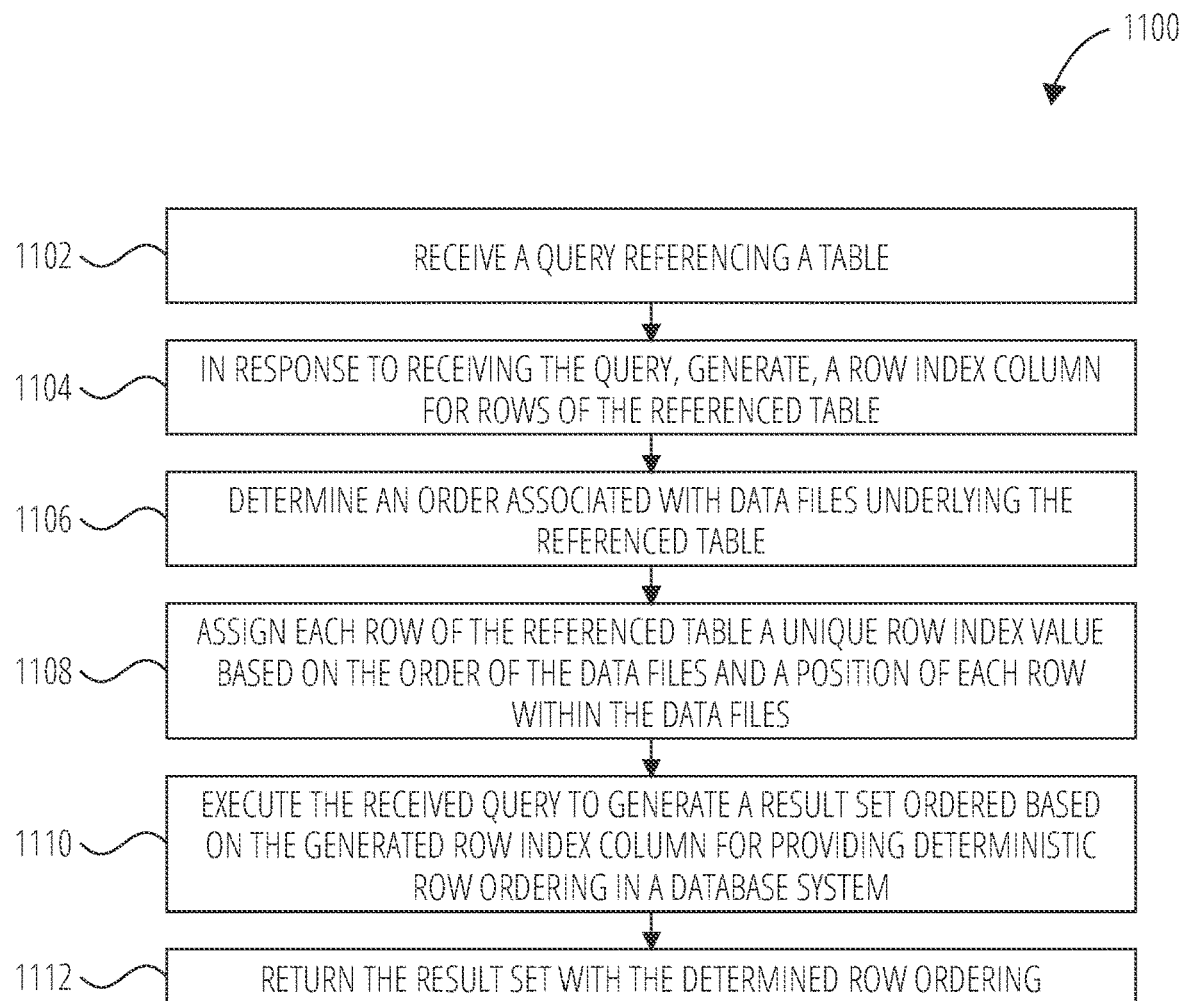
FIG. 11 illustrates an example flow diagram of a method for providing deterministic row ordering in a database system, according to some example embodiments.

FIG. 11 illustrates an example flow diagram of a method 1100, for providing deterministic row ordering in a database system, in accordance with one embodiment.

According to the present disclosure, example embodiments disclose methods of using a primitive running index by employing the SQL engine 142, the server environment 118, the client environment 116, and/or the developer framework 140. For example, the method 1100 can be embodied in machine-readable instructions or machine storage medium for execution by one or more hardware components such that the operations of the method 1100 can be performed by components of the cloud data platform 102, the client environment 116, or other components operably interconnected thereto. Accordingly, the method 1100 is described below, by way of example with reference to components of the cloud data platform 102. However, it shall be appreciated that method 1100 can be deployed on various other hardware configurations and is not intended to be limited to deployment within the cloud data platform 102. Depending on the embodiment, an operation of the method 1100 can be repeated in different ways or involve intervening operations not shown. Though the operations of the method 1100 can be depicted and described in a certain order, the order in which the operations are performed may vary among embodiments, including performing certain operations in parallel or performing sets of operations in separate processes. While the various operations in the method 1100 are presented and described sequentially, one of ordinary skill will appreciate that some or all of the operations may be executed in a different order, be combined or omitted, or be executed in parallel.

In block 1102, the server environment 118 receives a query referencing a table. In block 1104, the server environment 118, generates a row index column for rows of the referenced table in response to receiving the query. In block 1106, the server environment 118, determines an order associated with data files underlying the referenced table. In block 1108, at the server environment 118, assigns each row of the referenced table a unique row index value based on the order of the data files and a position of each row within the data files. In block 1110, the server environment 118, executes the received query to generate a result set ordered based on the generated row index column for providing deterministic row ordering in a database system. In block 1112, the server environment 118, returns the result set with the determined row ordering.

Described implementations of the subject matter can include one or more features, alone or in combination as illustrated below by way of example.

Example 1 is a method comprising: receiving, by at least one hardware processor, a query referencing a table; in response to receiving the query, generating a row index column for rows of a referenced table, the generating of the row index column comprising: determining an order associated with source files underlying the referenced table; and assigning each row of the referenced table a unique row position value based on the order of the source files and a position of each row within the source files; generating a result set based on execution of the received query, the result set being ordered based on the generated row index column to provide deterministic row ordering; and returning the result set with the deterministic row ordering.

In Example 2, the subject matter of Example 1 includes, wherein determining the order associated with the source files comprises: identifying names of the source files underlying the referenced table; and sorting the source files based on the identified names.

In Example 3, the subject matter of Examples 1-2 includes, wherein assigning each row of the referenced table the unique row position value comprises: determining an offset associated with each data file based on the order of the source files; and assigning each row of the referenced table the unique row position value based on the offset of the data file containing the row and the position of the row within the data file.

In Example 4, the subject matter of Examples 1-3 includes, employing the generated row position value for the referenced table for reuse when additional queries referencing the table are received by a database system.

In Example 5, the subject matter of Examples 1-4 includes, wherein executing the received query comprises: modifying the received query to include an ORDER BY clause based on the generated row index column.

In Example 6, the subject matter of Examples 1-5 includes, receiving a request to create a snapshot of the referenced table; creating a read-only snapshot of the referenced table; and wherein executing the received query comprises executing the query against the read-only snapshot instead of the referenced table.

In Example 7, the subject matter of Example 6 includes, wherein creating the read-only snapshot further comprises: disabling one or more background processes associated with the read-only snapshot that modify a structure of the source files associated with the read-only snapshot.

In Example 8, the subject matter of Examples 1-7 includes, wherein creating a read-only snapshot of the referenced table comprises: generating a clone of metadata associated with the referenced table without copying data of the referenced table; and associating a read-only access mode with the cloned table.

In Example 9, the subject matter of Examples 1-8 includes, wherein the referenced table comprises one of a database table, a view, or a snapshot.

In Example 10, the subject matter of Examples 1-9 includes, wherein assigning each row of the referenced table the unique row position value further comprises: determining that two or more rows of the referenced table have identical values across all columns; and assigning the two or more rows different unique row position values.

Example 11 is a system comprising: one or more hardware processors; and at least one memory storing instructions that, when executed by the one or more hardware processors, cause the system to perform operations comprising: receiving, by at least one hardware processor, a query referencing a table; in response to receiving the query, generating a row index column for rows of a referenced table, the generating of the row index column comprising: determining an order associated with source files underlying the referenced table; and assigning each row of the referenced table a unique row position value based on the order of the source files and a position of each row within the source files; generating a result set based on execution of the received query, the result set being ordered based on the generated row index column to provide deterministic row ordering; and returning the result set with the deterministic row ordering.

In Example 12, the subject matter of Example 11 includes, wherein determining the order associated with the source files comprises: identifying names of the source files underlying the referenced table; and sorting the source files based on the identified names.

In Example 13, the subject matter of Examples 11-12 includes, wherein assigning each row of the referenced table the unique row position value comprises: determining an offset associated with each data file based on the order of the source files; and assigning each row of the referenced table the unique row position value based on the offset of the data file containing the row and the position of the row within the data file.

In Example 14, the subject matter of Examples 11-13 includes, the operations comprising: employing the generated row position values for the referenced table for reuse when additional queries referencing the table are received by a database system.

In Example 15, the subject matter of Examples 11-14 includes, wherein executing the received query comprises: modifying the received query to include an ORDER BY clause based on the generated row index column.

In Example 16, the subject matter of Examples 11-15 includes, the operations comprising: receiving a request to create a snapshot of the referenced table; creating a read-only snapshot of the referenced table; and wherein executing the received query comprises executing the query against the read-only snapshot instead of the referenced table.

In Example 17, the subject matter of Example 16 includes, wherein creating the read-only snapshot further comprises: disabling one or more background processes associated with the read-only snapshot that modify a structure of the source files associated with the read-only snapshot.

In Example 18, the subject matter of Examples 11-17 includes, wherein creating a read-only snapshot of the referenced table comprises: generating a clone of metadata associated with the referenced table without copying data of the referenced table; and associating a read-only access mode with the cloned table.

In Example 19, the subject matter of Examples 11-18 includes, wherein the referenced table comprises one of a database table, a view, or a snapshot.

In Example 20, the subject matter of Examples 11-19 includes, wherein assigning each row of the referenced table the unique row position value further comprises: determining that two or more rows of the referenced table have identical values across all columns; and assigning the two or more rows different unique row position values.

Example 21 is a machine-storage medium embodying instructions that, when executed by a machine, cause the machine to perform operations comprising: receiving, by at least one hardware processor, a query referencing a table; in response to receiving the query, generating a row index column for rows of a referenced table, the generating of the row index column comprising: determining an order associated with source files underlying the referenced table; and assigning each row of the referenced table a unique row position value based on the order of the source files and a position of each row within the source files; generating a result set based on execution of the received query, the result set being ordered based on the generated row index column to provide deterministic row ordering; and returning the result set with the deterministic row ordering.

In Example 22, the subject matter of Example 21 includes, wherein determining the order associated with the source files comprises: identifying names of the source files underlying the referenced table; and sorting the source files based on the identified names.

In Example 23, the subject matter of Examples 21-22 includes, wherein assigning each row of the referenced table the unique row position value comprises: determining an offset associated with each data file based on the order of the source files; and assigning each row of the referenced table the unique row position value based on the offset of the data file containing the row and the position of the row within the data file.

In Example 24, the subject matter of Examples 21-23 includes, wherein the operations comprise: employing the generated row position values for the referenced table for reuse when additional queries referencing the table are received by a database system.

In Example 25, the subject matter of Example 24 includes, wherein executing the received query comprises: modifying the received query to include an ORDER BY clause based on the generated row index column.

In Example 26, the subject matter of Examples 21-25 includes, wherein the operations comprise: receiving a request to create a snapshot of the referenced table; creating a read-only snapshot of the referenced table; and wherein executing the received query comprises executing the query against the read-only snapshot instead of the referenced table.

In Example 27, the subject matter of Example 26 includes, wherein creating the read-only snapshot further comprises: disabling one or more background processes associated with the read-only snapshot that modify a structure of the source files associated with the read-only snapshot.

In Example 28, the subject matter of Examples 21-27 includes, wherein creating a read-only snapshot of the referenced table comprises: generating a clone of metadata associated with the referenced table without copying data of the referenced table; and associating a read-only access mode with the cloned table.

In Example 29, the subject matter of Examples 21-28 includes, wherein the referenced table comprises one of a database table, a view, or a snapshot.

In Example 30, the subject matter of Examples 21-29 includes, wherein assigning each row of the referenced table the unique row position value further comprises: determining that two or more rows of the referenced table have identical values across all columns; and assigning the two or more rows different unique row position values.

Example 31 is at least one machine-readable medium including instructions that, when executed by processing circuitry, cause the processing circuitry to perform operations to implement of any of Examples 1-30.

Example 32 is an apparatus comprising means to implement of any of Examples 1-30.

Example 33 is a system to implement of any of Examples 1-30.

Example 34 is a method to implement of any of Examples 1-30.

Figure 12:
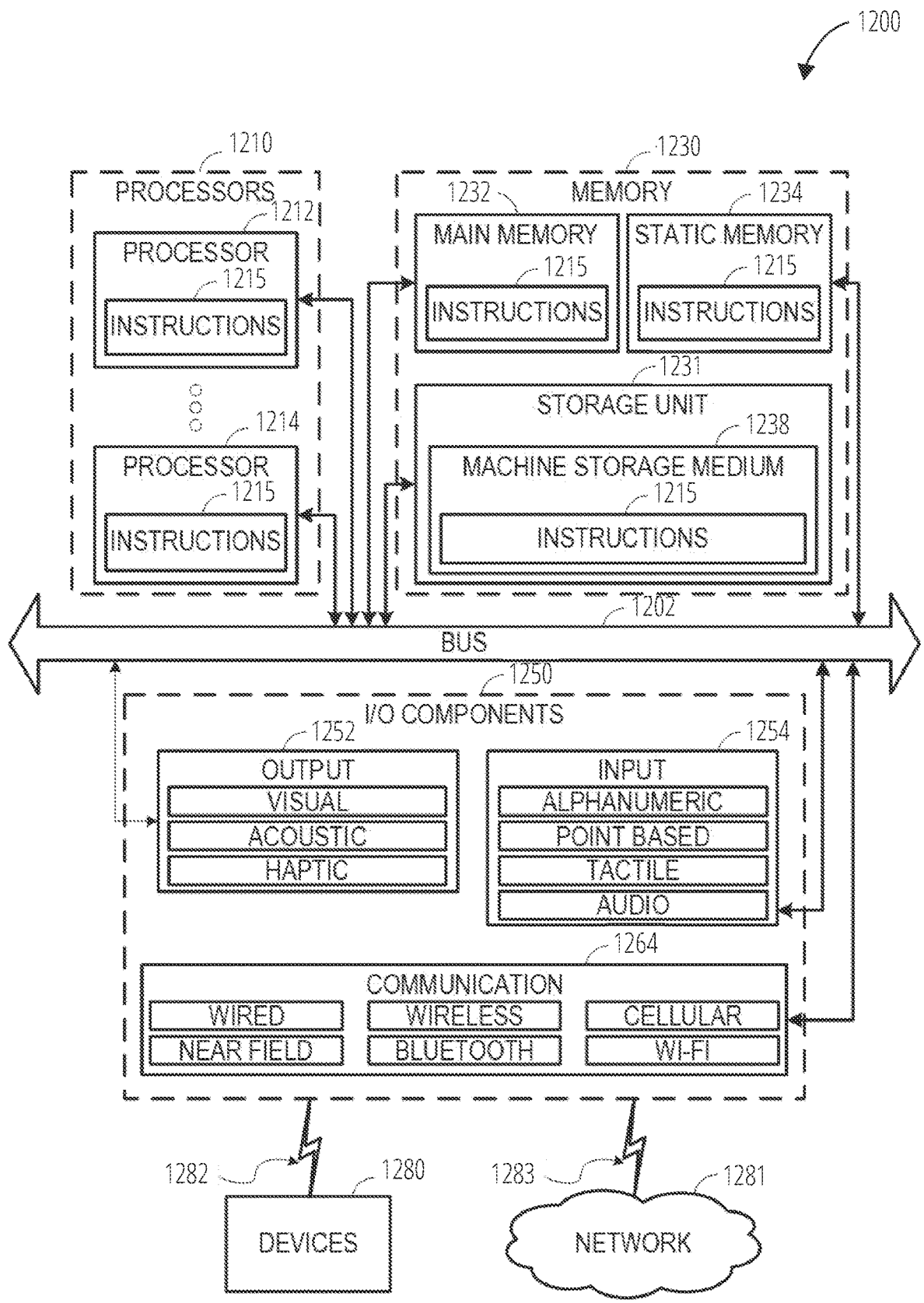
FIG. 12 illustrates an example diagrammatic representation of a machine in the form of a computer system within which a set of instructions may be executed for causing the machine to perform any one or more of the methodologies discussed herein, according to some example embodiments.

FIG. 12 illustrates a diagrammatic representation of a machine 1200 in the form of a computer system within which a set of instructions may be executed for causing the machine 1200 to perform any one or more of the methodologies discussed herein, according to an example embodiment.

Specifically, FIG. 12 shows a diagrammatic representation of the machine 1200 in the example form of a computer system, within which instructions 1215 (e.g., software, a program, an application, an applet, an app, or other executable code), for causing the machine 1200 to perform any one or more of the methodologies discussed herein (e.g., method 1000 and method 1100), may be executed. For example, the instructions 1215 may cause the machine 1200 to implement portions of the data flows described herein. In this way, the instructions 1215 transform a general, non-programmed machine into a particular machine 1200 (e.g., the client device 114 of FIG. 1, the compute service manager 108 of FIG. 1, the execution platform 110 of FIG. 1) that is specially configured to carry out any one of the described and illustrated functions in the manner described herein.

In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1215, sequentially or otherwise, that specify actions to be taken by the machine 1200. Further, while only a single machine 1200 is illustrated, the term "machine" shall also be taken to include a collection of machines 1200 that individually or jointly execute the instructions 1215 to perform any one or more of the methodologies discussed herein.

The machine 1200 includes processors 1210, memory 1230, and input/output (I/O) components 1250 configured to communicate with each other such as via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), tensor processing unit (TPU), a radio-frequency integrated circuit (RFIC), another processor, or any suitable combination thereof) may include, for example, a processor 1212 and a processor 1214 that may execute the instructions 1215. The term "processor" is intended to include multi-core processors 1210 that may comprise two or more independent processors (sometimes referred to as "cores") that may execute instructions 1215 contemporaneously. Although FIG. 12 shows multiple processors 1210, the machine 1200 may include a single processor with a single core, a single processor with multiple cores (e.g., a multi-core processor), multiple processors with a single core, multiple processors with multiple cores, or any combination thereof.

The memory 1230 may include a main memory 1232, a static memory 1234, and a storage unit 1231, all accessible to the processors 1210 such as via the bus 1202. The main memory 1232, the static memory 1234, and the storage unit 1231 comprise a machine storage medium 1238 that may store the instructions 1215 embodying any one or more of the methodologies or functions described herein. The instructions 1215 may also reside, completely or partially, within the main memory 1232, within the static memory 1234, within the storage unit 1231, within at least one of the processors 1210 (e.g., within the processor's cache memory), or any suitable combination thereof, during execution thereof by the machine 1200.

The I/O components 1250 include components to receive input, provide output, produce output, transmit information, exchange information, capture measurements, and so on. The specific I/O components 1250 that are included in a particular machine 1200 will depend on the type of machine. For example, portable machines, such as mobile phones, will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1250 may include communication components 1264 operable to couple the machine 1200 to a network 1281 via a coupler 1283 or to devices 1280 via a coupling 1282. For example, the communication components 1264 may include a network interface component or another suitable device to interface with the network 1281. In further examples, the communication components 1264 may include wired communication components, wireless communication components, cellular communication components, and other communication components to provide communication via other modalities. The devices 1280 may be another machine or any of a wide variety of peripheral devices (e.g., a peripheral device coupled via a universal serial bus (USB)). For example, as noted above, the machine 1200 may correspond to any one of the client device(s) 114, the compute service manager 108, and the execution platform 110, and may include any other of these systems and devices.

The various memories (e.g., 1230, 1232, 1234, and/or memory of the processor(s) 1210 and/or the storage unit 1231) may store one or more sets of instructions 1215 and data structures (e.g., software), embodying or utilized by any one or more of the methodologies or functions described herein. These instructions 1215, when executed by the processor(s) 1210, cause various operations to implement the disclosed embodiments.

Another general aspect is for a system that includes a memory comprising instructions and one or more computer processors or one or more hardware processors. The instructions, when executed by the one or more computer processors, cause the one or more computer processors to perform operations. In yet another general aspect, a tangible machine-readable storage medium (e.g., a non-transitory storage medium) includes instructions that, when executed by a machine, cause the machine to perform operations.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, (e.g., erasable programmable read-only memory (EPROM), electrically erasable programmable read-only memory (EEPROM), field-programmable gate arrays (FPGAs), and flash memory devices); magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1281 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1281 or a portion of the network 1281 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1215 may be transmitted or received over the network 1281 using a transmission medium via a network interface device (e.g., a network interface component included in the communication components 1264) and utilizing any one of a number of well-known transfer protocols (e.g., hypertext transfer protocol (HTTP)). Similarly, the instructions 1215 may be transmitted or received using a transmission medium via the coupling 1282 (e.g., a peer-to-peer coupling) to the devices 1280. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1215 for execution by the machine 1200, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

In some example embodiments, computer-readable files come in several varieties, including unstructured files, semi-structured files, and structured files. These terms may mean different things to different people. Examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data.

As used herein, examples of unstructured files include image files, video files, PDFs, audio files, and the like; examples of semi-structured files include JavaScript Object Notation (JSON) files, eXtensible Markup Language (XML) files, and the like. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

In the present disclosure, physical units of data that are stored in a cloud data platform—and that make up the content of, e.g., database tables in customer accounts (e.g., customer users)—are referred to as micro-partitions. In different implementations, a cloud data platform can store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the cloud data platform, a given file is referred to herein as an "internal file" and may be stored in (or at, or on, etc.) what is referred to herein as an "internal storage location." If stored external to the cloud data platform, a given file is referred to herein as an "external file" and is referred to as being stored in (or at, or on, etc.) what is referred to herein as an "external storage location."

While example embodiments of the present disclosure reference commands in the standardized syntax of the programming language Structured Query Language (SQL), it will be understood by one having ordinary skill in the art that the present disclosure can similarly apply to other programming languages associated with communicating and retrieving data from a database.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Also, in the above Detailed Description, various features can be grouped together to streamline the disclosure. However, the claims cannot set forth every feature disclosed herein, as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. A method comprising:
   receiving, by at least one hardware processor, a query referencing a table;
   in response to receiving the query, generating a row index column for rows of a referenced table, the generating of the row index column comprising:
   determining an order associated with source files underlying the referenced table; and
   assigning each row of the referenced table a unique row position value based on the order of the source files and a position of each row within the source files;
   generating a result set based on execution of the received query, the result set being ordered based on the generated row index column to provide deterministic row ordering; and
   returning the result set with the deterministic row ordering.

2. The method of claim 1, wherein determining the order associated with the source files comprises:
   identifying names of the source files underlying the referenced table; and
   sorting the source files based on the identified names.

3. The method of claim 1, wherein assigning each row of the referenced table the unique row position value comprises:
   determining an offset associated with each data file based on the order of the source files; and
   assigning each row of the referenced table the unique row position value based on the offset of the data file containing the row and the position of the row within the data file.

4. The method of claim 1, further comprising:
   employing the generated row position value for the referenced table for reuse when additional queries referencing the table are received by a database system.

5. The method of claim 1, wherein executing the received query comprises:
   modifying the received query to include an ORDER BY clause based on the generated row index column.

6. The method of claim 1, further comprising:
   receiving a request to create a snapshot of the referenced table;
   creating a read-only snapshot of the referenced table; and
   wherein executing the received query comprises executing the query against the read-only snapshot instead of the referenced table.

7. The method of claim 6, wherein creating the read-only snapshot further comprises:
   disabling one or more background processes associated with the read-only snapshot that modify a structure of the source files associated with the read-only snapshot.

8. The method of claim 1, wherein creating a read-only snapshot of the referenced table comprises:
   generating a clone of metadata associated with the referenced table without copying data of the referenced table; and
   associating a read-only access mode with the cloned table.

9. The method of claim 1, wherein the referenced table comprises one of a database table, a view, or a snapshot.

10. The method of claim 1, wherein assigning each row of the referenced table the unique row position value further comprises:
    determining that two or more rows of the referenced table have identical values across all columns; and
    assigning the two or more rows different unique row position values.

11. A system comprising:
one or more hardware processors; and
at least one memory storing instructions that, when executed by the one or more hardware processors, cause the system to perform operations comprising:
  receiving, by at least one hardware processor, a query referencing a table;
  in response to receiving the query, generating a row index column for rows of a referenced table, the generating of the row index column comprising:
    determining an order associated with source files underlying the referenced table; and
    assigning each row of the referenced table a unique row position value based on the order of the source files and a position of each row within the source files;
  generating a result set based on execution of the received query, the result set being ordered based on the generated row index column to provide deterministic row ordering; and
  returning the result set with the deterministic row ordering.

12. The system of claim 11, wherein determining the order associated with the source files comprises:
  identifying names of the source files underlying the referenced table; and
  sorting the source files based on the identified names.

13. The system of claim 11, wherein assigning each row of the referenced table the unique row position value comprises:
  determining an offset associated with each data file based on the order of the source files; and
  assigning each row of the referenced table the unique row position value based on the offset of the data file containing the row and the position of the row within the data file.

14. The system of claim 11, the operations comprising:
  employing the generated row position values for the referenced table for reuse when additional queries referencing the table are received by a database system.

15. The system of claim 11, wherein executing the received query comprises:
  modifying the received query to include an ORDER BY clause based on the generated row index column.

16. The system of claim 11, the operations comprising:
  receiving a request to create a snapshot of the referenced table;
  creating a read-only snapshot of the referenced table; and
  wherein executing the received query comprises executing the query against the read-only snapshot instead of the referenced table.

17. The system of claim 16, wherein creating the read-only snapshot further comprises:
  disabling one or more background processes associated with the read-only snapshot that modify a structure of the source files associated with the read-only snapshot.

18. The system of claim 11, wherein creating a read-only snapshot of the referenced table comprises:
  generating a clone of metadata associated with the referenced table without copying data of the referenced table; and
  associating a read-only access mode with the cloned table.

19. The system of claim 11, wherein the referenced table comprises one of a database table, a view, or a snapshot.

20. The system of claim 11, wherein assigning each row of the referenced table the unique row position value further comprises:
  determining that two or more rows of the referenced table have identical values across all columns; and
  assigning the two or more rows different unique row position values.

21. A machine-storage medium embodying instructions that, when executed by a machine, cause the machine to perform operations comprising:
  receiving, by at least one hardware processor, a query referencing a table;
  in response to receiving the query, generating a row index column for rows of a referenced table, the generating of the row index column comprising:
    determining an order associated with source files underlying the referenced table; and
    assigning each row of the referenced table a unique row position value based on the order of the source files and a position of each row within the source files;
  generating a result set based on execution of the received query, the result set being ordered based on the generated row index column to provide deterministic row ordering; and
  returning the result set with the deterministic row ordering.

22. The machine-storage medium of claim 21, wherein determining the order associated with the source files comprises:
  identifying names of the source files underlying the referenced table; and
  sorting the source files based on the identified names.

23. The machine-storage medium of claim 21, wherein assigning each row of the referenced table the unique row position value comprises:
  determining an offset associated with each data file based on the order of the source files; and
  assigning each row of the referenced table the unique row position value based on the offset of the data file containing the row and the position of the row within the data file.

24. The machine-storage medium of claim 21, wherein the operations comprise:
  employing the generated row position values for the referenced table for reuse when additional queries referencing the table are received by a database system.

25. The machine-storage medium of claim 24, wherein executing the received query comprises:
  modifying the received query to include an ORDER BY clause based on the generated row index column.

26. The machine-storage medium of claim 21, wherein the operations comprise:
  receiving a request to create a snapshot of the referenced table;
  creating a read-only snapshot of the referenced table; and
  wherein executing the received query comprises executing the query against the read-only snapshot instead of the referenced table.

27. The machine-storage medium of claim 26, wherein creating the read-only snapshot further comprises:
  disabling one or more background processes associated with the read-only snapshot that modify a structure of the source files associated with the read-only snapshot.

28. The machine-storage medium of claim 21, wherein creating a read-only snapshot of the referenced table comprises:
  generating a clone of metadata associated with the referenced table without copying data of the referenced table; and
  associating a read-only access mode with the cloned table.

29. The machine-storage medium of claim 21, wherein the referenced table comprises one of a database table, a view, or a snapshot.

30. The machine-storage medium of claim 21, wherein assigning each row of the referenced table the unique row position value further comprises:
- determining that two or more rows of the referenced table have identical values across all columns; and
- assigning the two or more rows different unique row position values.

* * * * *